United States Patent [19]
Zhang

[11] Patent Number: 5,142,664
[45] Date of Patent: Aug. 25, 1992

[54] PROCESSING UNIT USING TRUTH-VALUED FLOW

[75] Inventor: Hongmin Zhang, Machida, Japan
[73] Assignee: Apt Instruments Corp., Tokyo, Japan
[21] Appl. No.: 445,532
[22] Filed: Dec. 4, 1989

[30] Foreign Application Priority Data

Dec. 7, 1988 [JP] Japan .................. 63-307697

[51] Int. Cl.$^5$ ............................................. G06F 15/18
[52] U.S. Cl. ............................................ 395/3; 395/900
[58] Field of Search .................... 364/513, 807, 200; 395/3

[56] References Cited

U.S. PATENT DOCUMENTS 4,837,725 6/1989 Yamakawa .................... 364/807
4,875,184 10/1984 Yamakawa .................... 364/807

FOREIGN PATENT DOCUMENTS 62-95676 2/1987 Japan .
62-95677 2/1987 Japan .

OTHER PUBLICATIONS

Yamakawa et al., "Fuzey Memory Device", *Preprints of Second IFSA Congress* Tokyo, Jul. 20–25 1987, pp. 551–555.
Yamakawa, "A Simple Fuzey Computer Hardware System Employing Min & Max Operations", *Preprints of Second IFSA Congress* Tokyo, Jul. 20–25, 1987, pp. 827–830.

*Primary Examiner*—Michael R. Fleming
*Assistant Examiner*—Robert W. Downs
*Attorney, Agent, or Firm*—Dickstein, Shapiro & Morin

[57] ABSTRACT

A truth-valued-flow processing unit according to the invention comprises truth value generator circuits truth-valued-flow inference units a truth value converter, a first bus and a second bus. The first bus is provided in a number equal to the number of kinds of input variables. The second bus comprises a number of lines equal to the number of kinds of a plurality of predetermined functions used by the consequents of implications. The truth value generator circuit is provided in a number equal to the number of kinds of input variables. Each truth value generator circuit is connected at an output side thereof to a corresponding one of the first buses, generates truth values and outputs the truth values on the corresponding first bus. Each truth-valued-flow inference unit is connected at an input side thereof to all of the first buses and at an output side thereof to one line of the second bus, selects, from all truth values outputted by the plurality of truth value generator circuits prescribed ones of the truth values in accordance with predetermined rules and subjects these truth values to a prescribed operation. The truth value converter causes the truth values outputted by the plurality of truth-valued-flow inference units to act upon each of the plurality of functions used by the consequent, thereby providing an output representing inferential results.

2 Claims, 31 Drawing Sheets

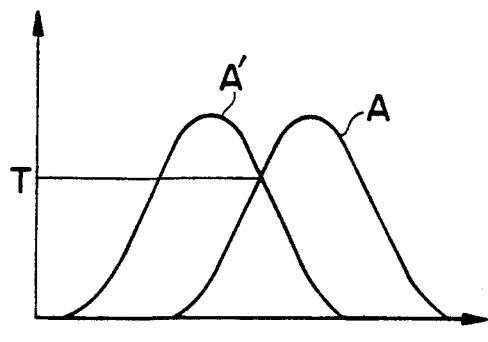
Fig.1
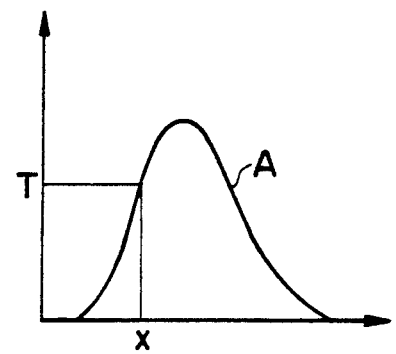
Fig.2
Fig.3
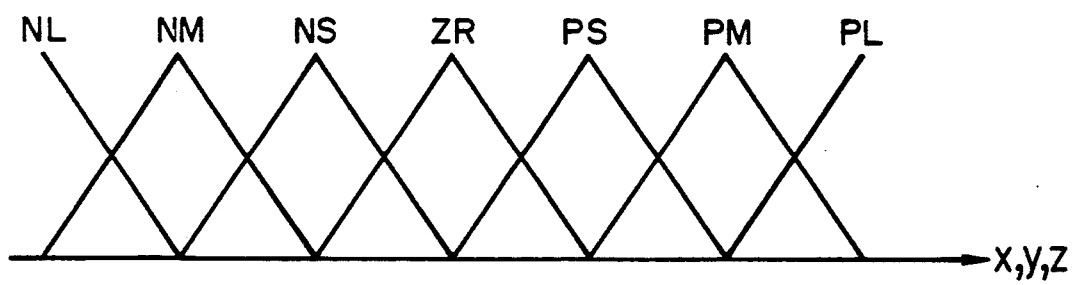
Fig.4
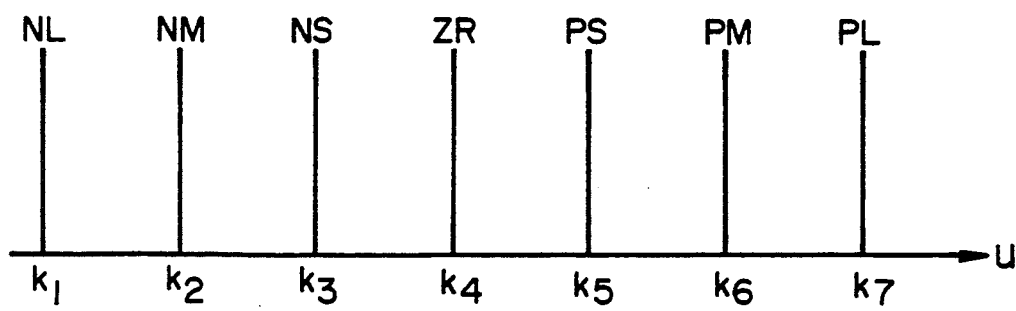

Fig.18

| ADDRESS | | | DATA | |
|---|---|---|---|---|
| $a_{11}\sim a_9$ | $a_8\sim a_6$ | $a_5\sim a_0$ | $d_0 d_1 d_2 d_3$ | $d_4 d_5 d_6 d_7$ |
| | DESIGNATES TYPE OF MEMBERSHIP FUNCTION NL | VARIALBE 0~63 | NL-1 | |
| | | | NL-2 | |
| | | | NL-3 | |
| | | | NL-4 | |
| | | | NL-5 | |
| | | | NL-6 | |
| | | | NL-7 | |
| | | | NL-8 | |
| DESIGNATES TYPE OF MEMBERSHIP FUNCTION NM | | | | NM-1 |
| | | | | NM-2 |
| | | | | NM-3 |
| | | | | NM-4 |
| | | | | NM-5 |
| | | | | NM-6 |
| | | | | NM-7 |
| | | | | NM-8 |

RULE NO. | INPUT X | INPUT Y | INPUT Z | OUTPUT

LINGUISTIC
INFORMATION

WEIGHTED
COEFFICIENT
(0~255)

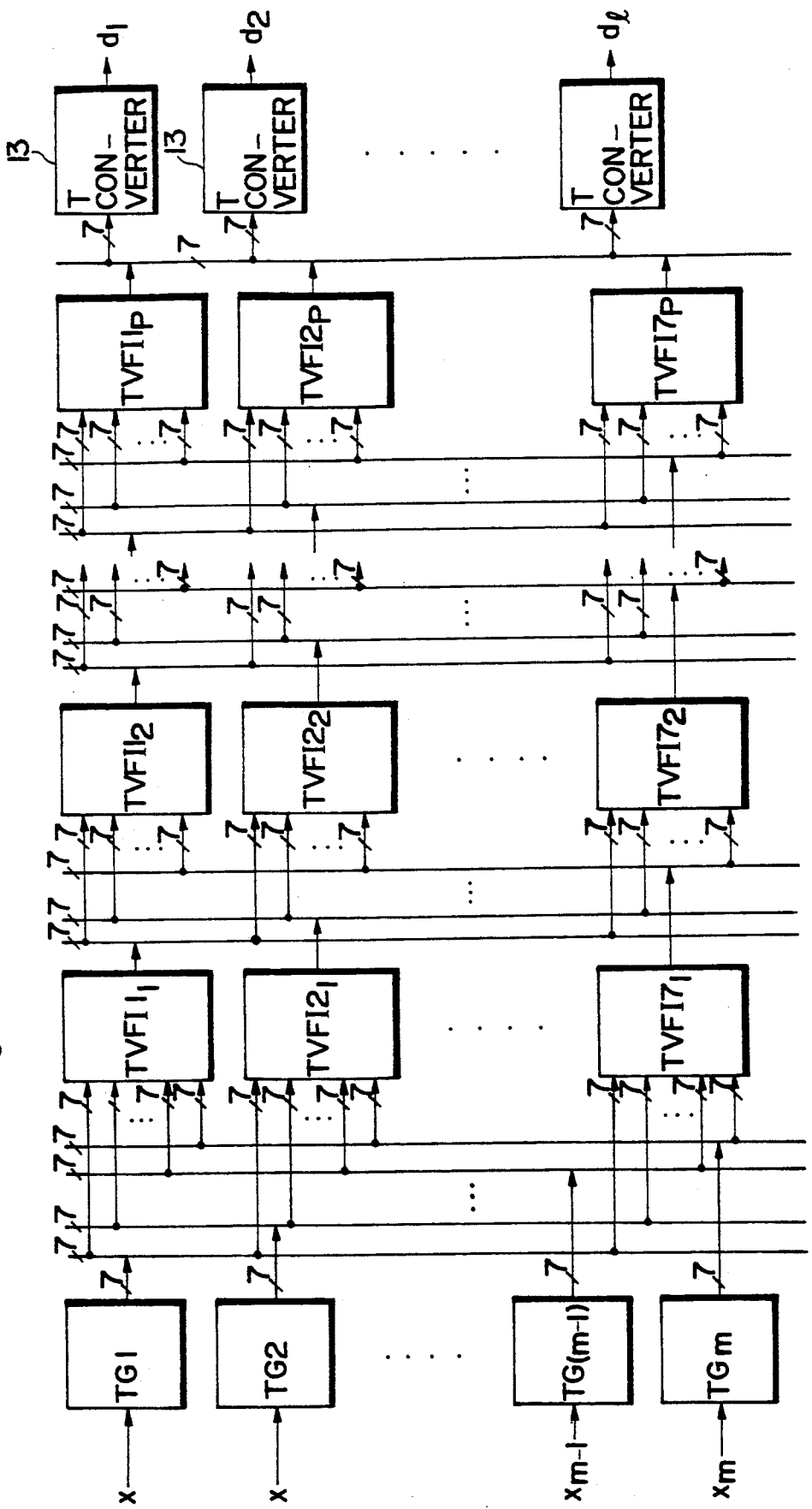

5,142,664

PROCESSING UNIT USING TRUTH-VALUED FLOW

BACKGROUND OF THE INVENTION

1. Field of the Invention

This invention relates to a truth-valued-flow processing unit for processing such information as fuzzy information, 2-valued information and multivalued information.

As will be set forth in this specification, a truth value refers to a concept which includes the truth values in 2-valued and multivalued logic, as well as the grades of membership functions in fuzzy theory.

2. Description of the Prior Art

Systems have been developed for performing fuzzy inference in accordance with a modus ponens inference format referred to using such names as fuzzy computers, fuzzy controllers, fuzzy inference units, fuzzy operation units, fuzzy processing units and the like. These systems are the object of much attention. Fuzzy inference units generally are of two types, namely analog and digital. The analog-type fuzzy inference unit has a high inference speed but involves some difficulties in terms of achieving interfacing with a digital computer. On the other hand, the digital-type inference unit has a slightly lower inference speed than that of the analog type but is easy to connect to a digital computer.

Both the analog- and digital-type units have a plurality (and in some cases, a large number) of rules referred to as "If, then" rules set for them, and they perform predetermined inference processing in accordance with these rules. The setting of rules is of necessity accompanied by the setting of membership functions. If the number of rules increases, then it is necessary to set a correspondingly large number of membership functions.

SUMMARY OF THE INVENTION

An object of the present invention is to provide a truth-valued-flow processing unit which, while of the analog type, is readily interfaced with a digital computer, and wherein the setting of membership functions is performed separately of the setting of rules to facilitate the setting and modifying of rules.

A truth-valued-flow processing unit according to the present invention comprises truth value generator circuits, truth-valued-flow inference units, a truth value converter, a first bus and a second bus.

The first bus is provided in a number equal to the number of kinds of input variables. Each of the first buses comprises a number of lines equal to the number of kinds of a plurality of predetermined functions used in the antecedents of implications.

The second bus comprises a number of lines equal to the number of kinds of a plurality predetermined functions used in the consequents of implications.

The truth value-generator circuits are provided in a number equal to the number of kinds of input variables. Each truth value generator circuit is connected at an output side thereof to a corresponding one of the first buses, generates truth values, which correspond to an applied input variable, with regard to a plurality of functions used in the antecedents of implications, and outputs the truth values on the corresponding first bus.

The truth-valued-flow inference units are provided in a number equal to the number of a plurality of functions used in the consequents of implications. Each truth-valued-flow inference unit is connected at an input side thereof to all of the first buses and at an output side thereof to one line of the second bus, and selects, from all truth values outputted by the plurality of truth value generator circuits and inputted thereto via the first buses, prescribed ones of the truth values in accordance with predetermined rules and subjects these truth values to a prescribed operation, thereby generating a truth value that is to act upon the corresponding consequent and outputting the truth value on the second bus.

The truth value converter causes the truth values outputted by the plurality of truth-valued-flow inference units and inputted thereto via the second bus to act upon each of the plurality of functions used in the consequent, thereby providing an output representing inferential results.

In accordance with the present invention, all kinds of functions used in the antecedents of implications are preset in the truth value generator circuits, and all truth values outputted by the truth value generator circuits are applied to the truth-valued-flow inference unit. The latter correspond to the functions used in the consequents.

Accordingly, the setting of rules can be carried out by the truth-valued-flow inference units, and this setting operation can be separated from setting of functions. Moreover, the setting of rules is directly related to the selection of truth values inputted to the truth-valued-flow inference units, and the selection of the input truth values can be carried out in the form of digital signals. The setting and modification of rules can be performed with ease, and interfacing with digital apparatus can be readily achieved. In addition, an increase or decrease in the number of rules can be dealt with easily.

Since the truth-valued-flow inference units correspond to respective ones of the consequent functions, all antecedents for which the function of the consequent is the same can be processed by a single truth-valued-flow inference unit. This makes it possible to simplify the circuit arrangement.

Furthermore, since inferential processing is carried out by a configuration in which truth values are transmitted from the truth value generator circuits to the truth value converter, it is possible for truth values represented by analog signals to be transmitted on a single line. As a result, the number of connecting lines between circuits can be greatly reduced.

Further, in accordance with the present invention, the plurality of truth value generator circuits, the plurality of truth-valued-flow inference units and the truth value converter are connected by bus configuration. Therefore, only a small number of lines is sufficient and it is unnecessary to increase the number of lines even if the number of circuits to be connected is increased. In addition, it is easy to connect a large number of truth value inference units or the like in hierarchical form to construct a larger scale system.

BRIEF DESCRIPTION OF THE DRAWINGS

FIGS. 1 and 2 are graphs for describing truth values;
FIG. 3 is a graph showing an example of membership functions;
FIG. 4 is a graph showing an example of singletons.

FIG. 18 is a memory map showing the contents of a memory in which membership functions have been set;

FIG. 35 is a block diagram showing an example of a system having a hierarchical structure.

DESCRIPTION OF THE PREFERRED EMBODIMENT

Figure 5:
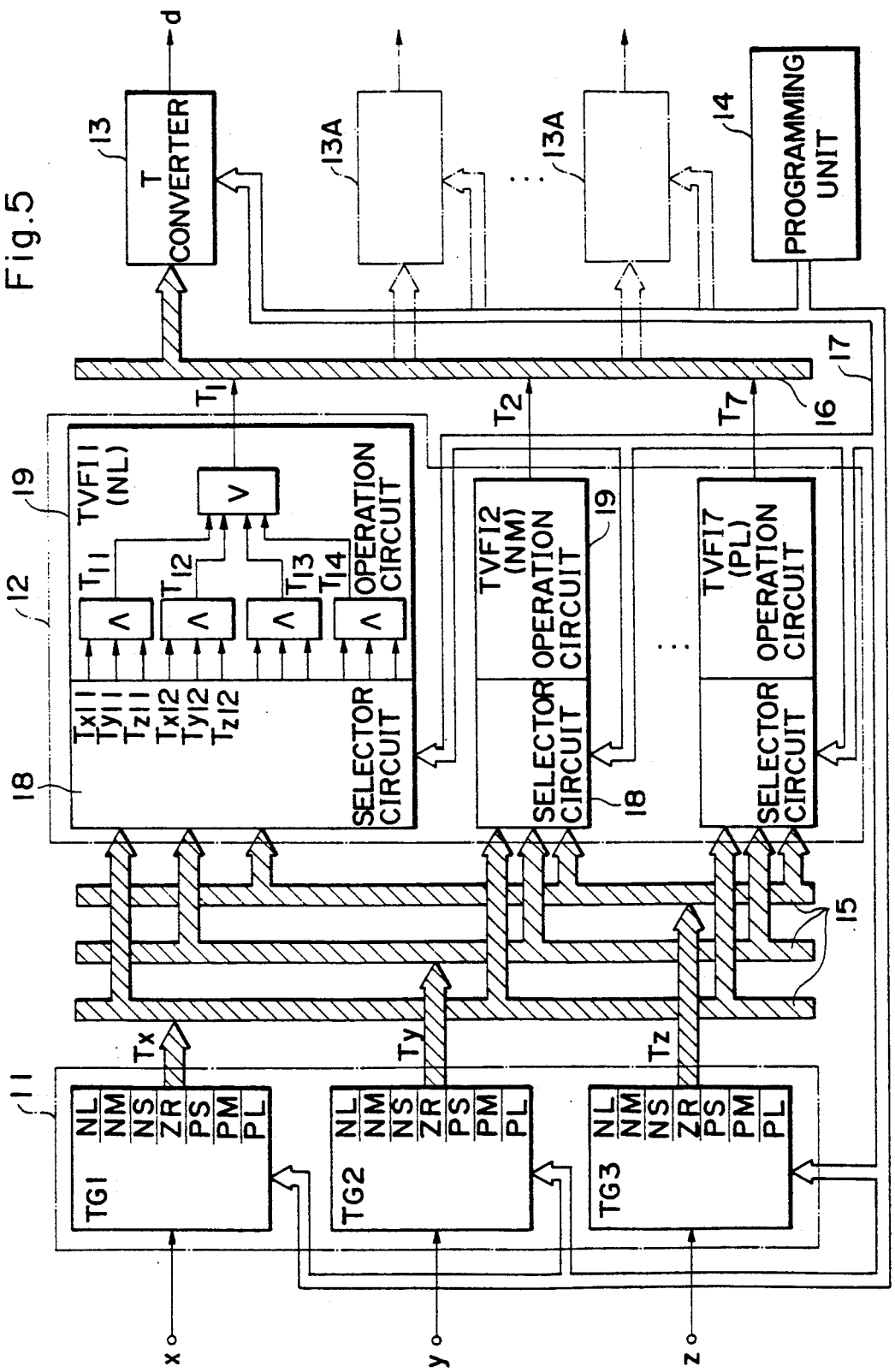
FIG. 5 is a block diagram showing the overall construction of a fuzzy processing system.

An embodiment in which the present invention is applied to a processing system for executing fuzzy inference will now be described in detail.

(1) Overall system configuration

Fuzzy inference in accordance with modus ponens generally is expressed in the form of "If, then" rules, as follows:

Implication

If $X=A_1$ and $Y=B_1$ and $Z=C_1$, then $U=D_1$
If $X=A_2$ and $Y=B_2$ and $Z=C_2$, then $U=D_2$ If $X=A_r$ and $Y=B_r$ and $Z=C_r$, then $U=D_r$ Premise $$X=A' \text{ and } Y=B' \text{ and } Z=C' \quad (1)$$

Conclusion $$U=D' \quad (2)$$

In the foregoing, $A_i$, $B_i$, $C_i$, $D_i$ (i=1−r), A', B', C', D' are fuzzy sets. These fuzzy sets are expressed by membership functions, as will be described hereinbelow.

In the description given above, the antecedent of each implication contains three fuzzy propositions, though the number thereof is arbitrary. The number of implications is also arbitrary.

In many applications of fuzzy inference, there are instances where the consequent is the same with respect to the antecedents of a plurality of different implications. If a plurality of implications having antecedents for which the consequents are identical are grouped together and the antecedents of the group are connected by an "or", the following new implication is obtained:

$$\text{If } (X=A_{i1}, Y=B_{i1}, Z=C_{i1}) \text{ or } (X=A_{i2}, Y=B_{i2}, Z=C_{i2}) \text{ or } (X=A_{i3}, Y=B_{i3}, Z=C_{i3}) \text{ or } (X=A_{i4}, Y=B_{i4}, Z=C_{i4}) \text{ then } U=D_i \quad (3)$$

Here "and" connecting the fuzzy propositions in the antecedents is deleted. Though the four antecedents are connected by "or" in the foregoing, it goes without saying that the number of antecedents that can be connected is arbitrary.

The implications described above are set to be n in number (i=1−n, with n being seven in the circuit arrangement illustrated hereinbelow).

Premises and conclusions are expressed using Eqs. (1) and (2), as before.

Modus ponens inference of a new form, which is expressed using a plurality of new implications typified by Eq. (3), the premise of Eq. (2) and the conclusion of Eq. (3), is executed from the viewpoint of truth value transmission. This is referred to as "truth-valued-flow inference" (abbreviated as "TVFI" hereinafter).

A truth value T in fuzzy theory is defined as follows, in which A, A' serve as membership functions:

$$T = NEAR(A', A) = V(A' \wedge A) \quad (4)$$

The meaning of Eq. (4) is illustrated in FIG. 1. A MIN operation between membership functions A and A' is performed and the maximum value of the result of this MIN operation (namely the result of a MAX operation) is the truth value T.

In a case where a fuzzy processing system is employed as a fuzzy controller, the input thereto generally is applied as a definite value x. In such case, the truth value T becomes a function value A(x) of the membership function A which prevails when the function x is applied.

When, in accordance with the MIN/MAX operational rule, the premise of Eq. (1) is applied, the truth values for the fuzzy propositions in the new implication of Eq. (3) are given by the following equations:

$$T_{Aij} = V(A' \wedge A_{ij})$$

$$T_{Bij} = V(B' \wedge B_{ij})$$

$$T_{Cij} = V(C' \wedge C_{ij})$$

$$i = 1 - n$$

$$j = 1 - 4 \tag{5}$$

The flow of truth values for each new implication of Eq. (3) is referred to as a "channel". The final truth value in each channel is given by the following equation:

$$T_i = \bigvee_{j=1}^{4} (T_{Aij} \wedge T_{Bij} \wedge T_{Cij}) \tag{6}$$

When a premise is given by definite values x, y, z, as mentioned above, the truth values of Eq. (5) become as follows:

$$T_{xij} = A_{ij}(x)$$

$$T_{yij} = A_{ij}(y)$$

$$T_{zij} = A_{ij}(z) \tag{7}$$

The final truth value $T_i$ of each channel given by Eq. (6) is as follows:

$$T_i = \bigvee_{j=1}^{4} (T_{xij} \wedge T_{yij} \wedge T_{zij}) \tag{8}$$

A conclusion D' can be obtained by applying the truth value $T_i$ [Eq. (6) or Eq. (8)] of each channel to the membership function $D_i$ of the consequent of the corresponding channel.

In a case where the MIN/MAX operation and an arithmetic product operation are used, the conclusion D' is given by the following equations:

$$D' = \bigvee_{i=1}^{n} T_i \wedge D_i \tag{9}$$

$$D' = \sum_{i=1}^{n} T_i \cdot D_i \tag{10}$$

The conclusion D' can be defuzzified by using a center-of-gravity method, in which case the following equation is employed:

$$d = \int u \cdot D'(u) du / \int D'(u) du \tag{11}$$

When the membership function $D_i$ of the consequent in each channel is expressed by a singleton $k_i$, the defuzzified conclusion d is expressed very simply. Specifically, we have $$d = \sum_{i=1}^{n} T_i \cdot k_i / \sum_{i=1}^{n} T_i \tag{12}$$

The singleton $k_i$ can be referred to as a weighted coefficient. The method of obtaining the conclusion d defuzzified in accordance with Eq. (12) is referred to as "Center of gravity with Truth-value Variable Weights" (CTVW), which employs truth values and variable weighting.

In this embodiment, seven kinds of membership functions of triangular shape are used, as illustrated in FIG. 3. These membership functions are represented by linguistic information NL, NM, NS, ZR, PS, PM, PL, respectively, where N represents "negative", P "positive", L "large", M "medium" and S "small". For example, NL means a negative, large value, and PS means a positive, small value. ZR signifies approximately zero.

FIG. 4 illustrates the singletons of these seven types of linguistic information NL-PL. The abovementioned weighted coefficients are indicated by $k_1$-$k_7$.

The overall construction of a fuzzy processing system will now be described with reference to FIG. 5 while bearing in mind the basic theory set forth above. This system is constructed in accordance with the TVFI method mentioned above, and use is made also of the CTVW method. The input (premise) is given by the definite values x, y, z.

The fuzzy processing system comprises a truth value generator circuit array 11 (hereinafter referred to as a TG array 11, where TG stands for "Truth value Generator"), a truth-valued-flow inference array 12 (hereinafter referred to as a TVFI array 12), a T converter 13, truth value buses (analog voltage buses) 15, 16 interconnecting the foregoing components, a programming unit 14 for setting, modifying and displaying the abovementioned "If, then" rules, membership functions and weighted coefficients, and a system bus (binary signal bus) 17 connecting the programming unit 14 to the arrays 11, 12 and T converter 13.

The TG array 11 includes three truth value generator circuits (hereinafter referred to simply as TG1, TG2, TG3 or, when named generically, as TG). TG1, which includes internal circuits for outputting the seven kinds of membership functions NL-PL mentioned earlier, outputs truth values $T_{xNL}$, $T_{xNM}$, $T_{xNS}$, $T_{xzR}$, $T_{xPS}$, $T_{xPM}$ and $T_{xPL}$ (these are referred to generically in FIG. 5 and represented by $T_x$) with respect to the applied input x. By way of example, $T_{xNL}$ represents the truth value of the membership function NL when x is applied. TG2 and TG3 are similarly constructed and output truth values $T_y$, $T_z$ (of which there are seven types each) with respect to the inputs y and z, respectively.

The TVFI array 12 includes truth-valued-flow inference units (hereinafter referred to simply as TVFI1, TVFI2, ..., TVFI7 or, when named generically, as TVFI) the number of which is the same as the number n of channels (seven in this embodiment). Channel 1 is composed of grouped implications for which the membership function of the consequent is NL, and the output truth value $T_1$ of the TVFI1 is applied to the membership function (singleton) NL in the T converter 13. Similarly, the channels 2, 3, 4, 5, 6 and 7 are each composed of grouped implications for which the membership functions of the consequent are NM, NS, ZR, PS, PM and PL, respectively, and the output truth values $T_2$, $T_3$, $T_4$, $T_5$, $T_6$ and $T_7$ of the TVFI2, 3, 4, 5, 6 and 7 are applied to the membership functions NM, NS, ZR, PS, PM and PL, respectively.

The 21 truth values $T_x$, $T_y$, $T_z$ outputted by the TG1, TG2 and TG3 are applied to each TVFI via the truth value bus 15. The TVFI's comprise respective selector circuits 18 for selecting, from the inputted truth values $T_x$, $T_y$, $T_z$, the truth values $T_{xij}$, $T_{yij}$, $T_{zij}$ (in this embodiment, j=1–4) [see Eq. (7)] in accordance with the rules set for these channels, and respective operation circuits 19 for calculating a truth value $T_i$ for each channel in accordance with Eq. (8) using these selected truth values.

The truth value Ti (i=1−n) calculated by each TVFI is fed into the T converter 13 through the truth value bus 16. The T converter 13 calculates and outputs the final value d in accordance with Eq. (12).

Each truth value bus 15 is composed of seven lines (equivalent to the number of kinds of membership functions NL-PL). One bus 15 is connected to each TG, and three buses are connected to each of the TVFI's. The truth value bus 16 also is composed of seven lines (equivalent to the number n of channels, and equivalent also to the number of kinds of membership functions NL-PL), and is connected to the T converter 13. It will suffice to connect one line from each TVFI to the corresponding line of the bus 16.

The system bus 17 is composed of an address bus, a data bus and a control bus, as is well known, and delivers various data and commands from the programming unit 14 to each TG, each TVFI and the T converter 13.

The truth values generated by each TG are transmitted to the TVFI's through the buses 15, the truth values are submitted to processing within the TVFI's, and the results of processing are inputted to the T converter 13 through the bus 16. Fuzzy inference is thus executed through this flow of truth values, and the manner in which this occurs can readily be understood from FIG. 5. This is the reason why the foregoing is referred to as truth-valued-flow inference.

(2) Truth value generator circuit (TG)

An analog-type TG will be described first.

Figure 6:
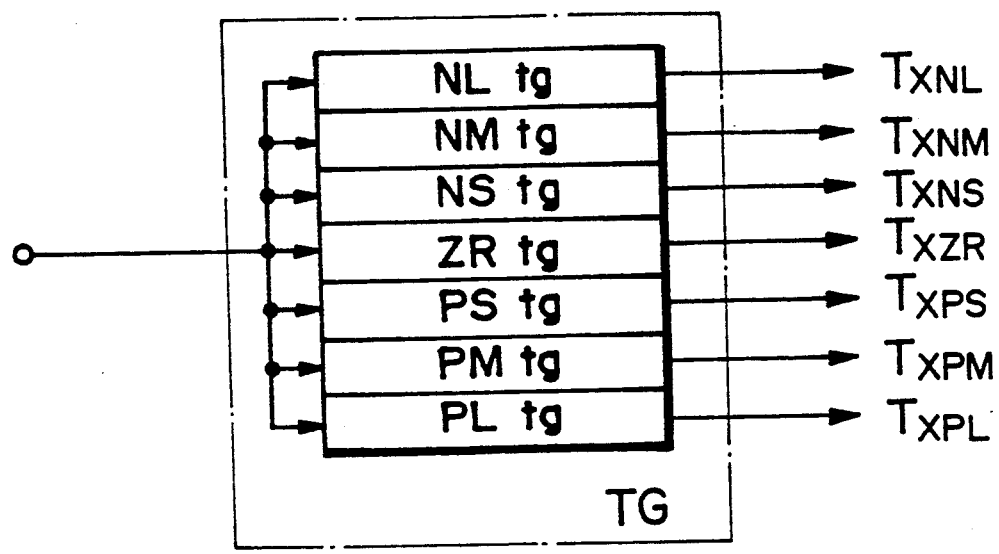
FIG. 6 is a block diagram showing the concept of a truth value generator circuit.
Figure 7:
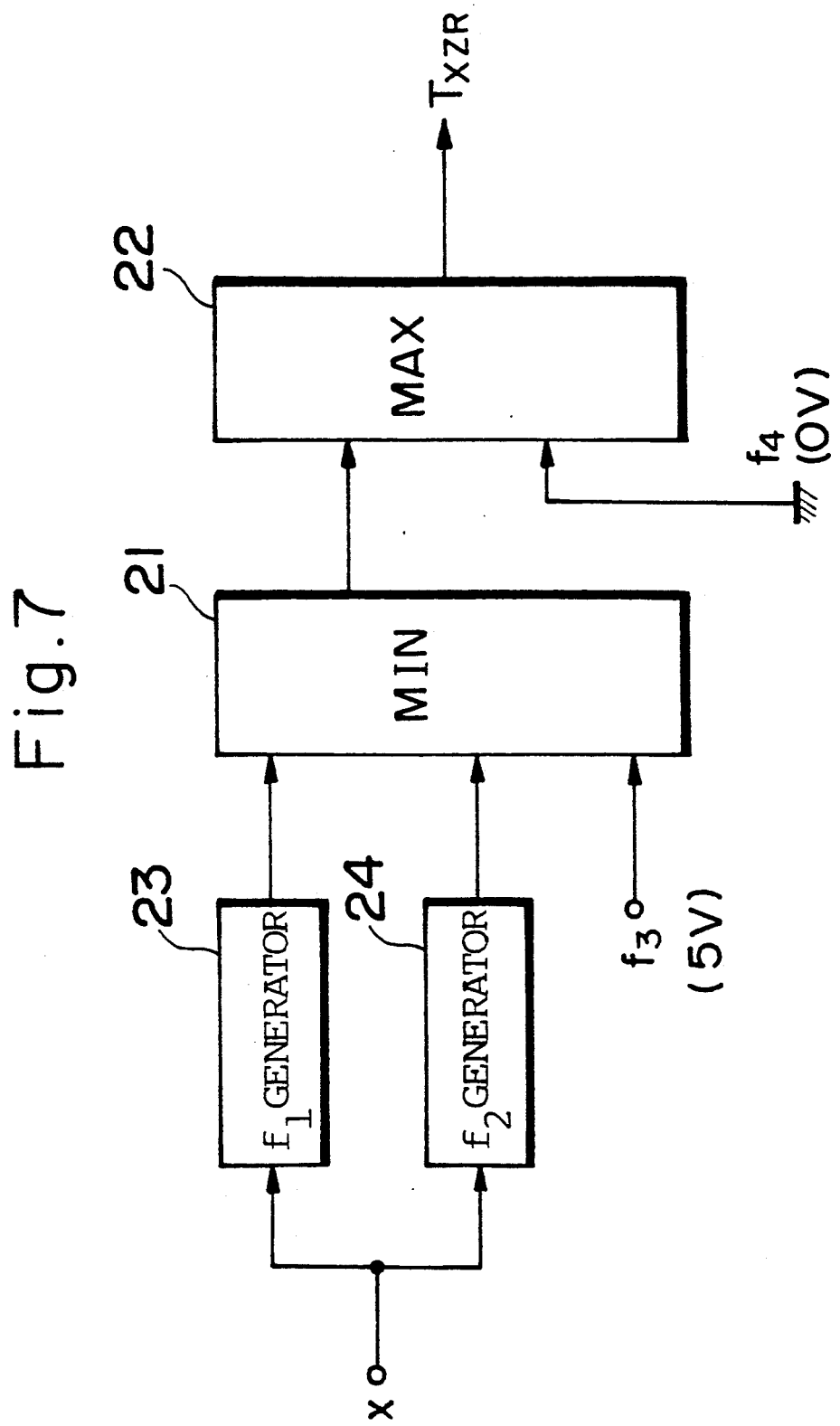
FIG. 7 is a block diagram showing an example of an analog-type membership function circuit.
Figure 8:
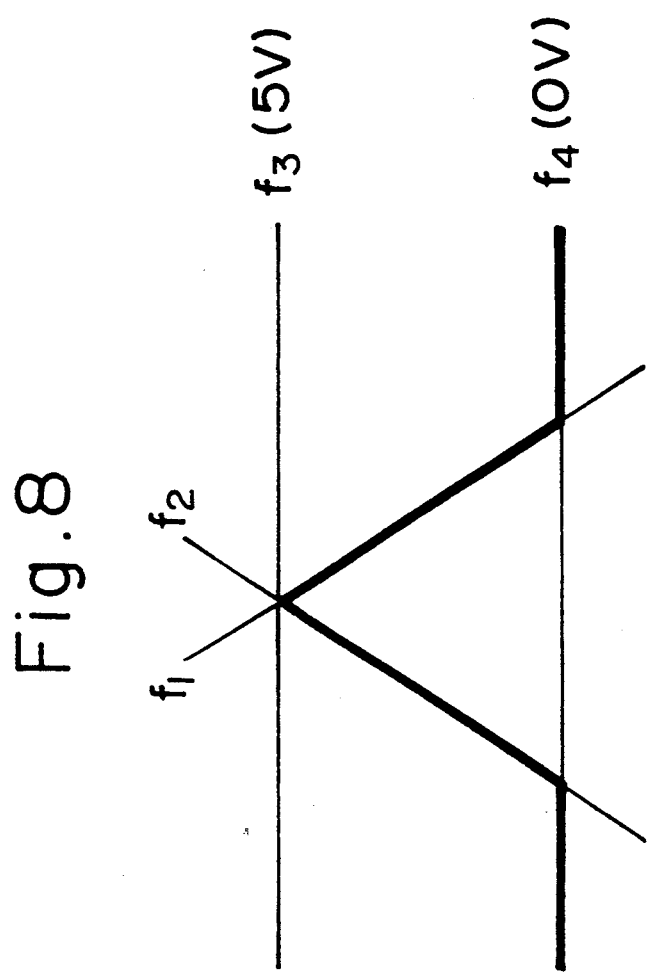
FIG. 8 is a graph showing the manner in which a membership function is generated by combining four functions.

As set forth above, the TG generates truth values, with respect to input variables, regarding the seven kinds of membership functions NL-PL. As illustrated in FIG. 6, each TG is equipped with seven membership function circuits tg (NLtg-PLtg), which output respective truth values $T_x$ ($T_{xNL}$-$T_{xPL}$) (when the input is x). Since these membership function circuits are all identically constructed, the circuit relating to the membership function ZR will be described with reference to FIGS. 7 and 8.

The membership function circuit generates a truth value based on a combination of four types of linear functions. The four linear functions are expressed as follows:

$$f_1 = -\alpha_1 x + \beta_1$$

$$f_2 = \alpha_2 x + \beta_2$$

$$f_3 = 1$$

$$f_4 = 0 \qquad (13)$$

In the foregoing, $\alpha_1$, $\alpha_2$, $\beta_1$, $\beta_2$ are constants.

The function $f_3$ generates grade 1 (which corresponds to a voltage of 5 V, by way of example), and the function $f_4$ generates grade 0.

A triangular membership function is formed by applying the following operation to the four types of linear functions mentioned above:

$$(f_1 \wedge f_2 \wedge f_3) \vee f_4 \qquad (14)$$

Accordingly, the voltage output of a function $f_1$ generator circuit 23, the voltage output of a function $f_2$ generator circuit 24, and a voltage (5 V) representing grade 1 (function $f_3$) are applied to a MIN circuit 21, and the output voltage of the MIN circuit 21 and a voltage (0 V) representing grade 0 (function $f_4$) are applied to a MAX circuit 22, where the MAX circuit 22 outputs a voltage representing a truth value.

Figure 9:
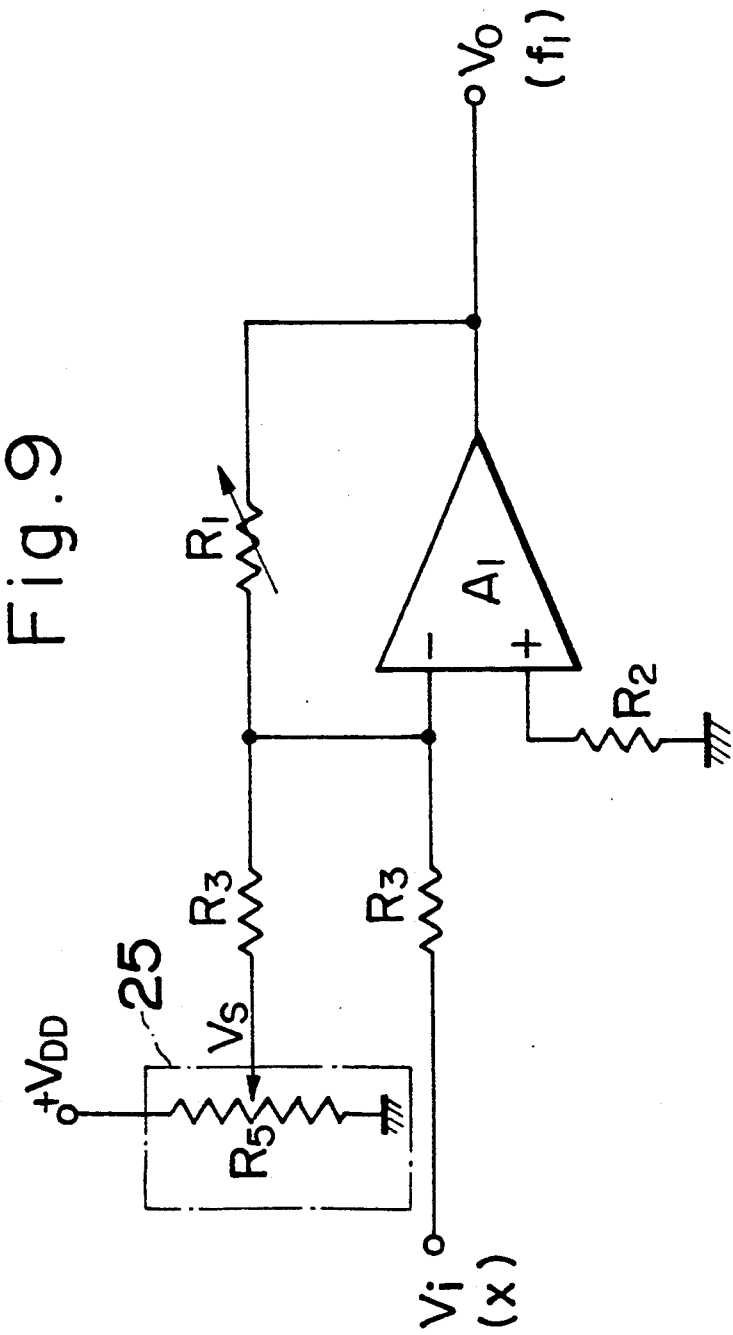
FIG. 9 is a circuit diagram showing an example of a function generator circuit.

An example of the circuit 23 for generating the function $f_1$ is illustrated in FIG. 9. This circuit uses an operational amplifier A1. An input voltage $V_i$ (which corresponds to the variable x) is applied to an inverting input terminal of the operational amplifier A1 via an input resistor $R_3$. Also applied to the inverting input terminal via a resistor $R_3$ is an output voltage $V_s$ of a variable voltage generator circuit 25, which includes a variable resistor $R_5$. A feedback resistor $R_1$ is a variable resistor. The output voltage $V_0$ (corresponding to $f_1$) is given by the following equation:

$$V_0 = (-R_1/R_3)(V_i + V_s) \qquad (15)$$

Figure 10:
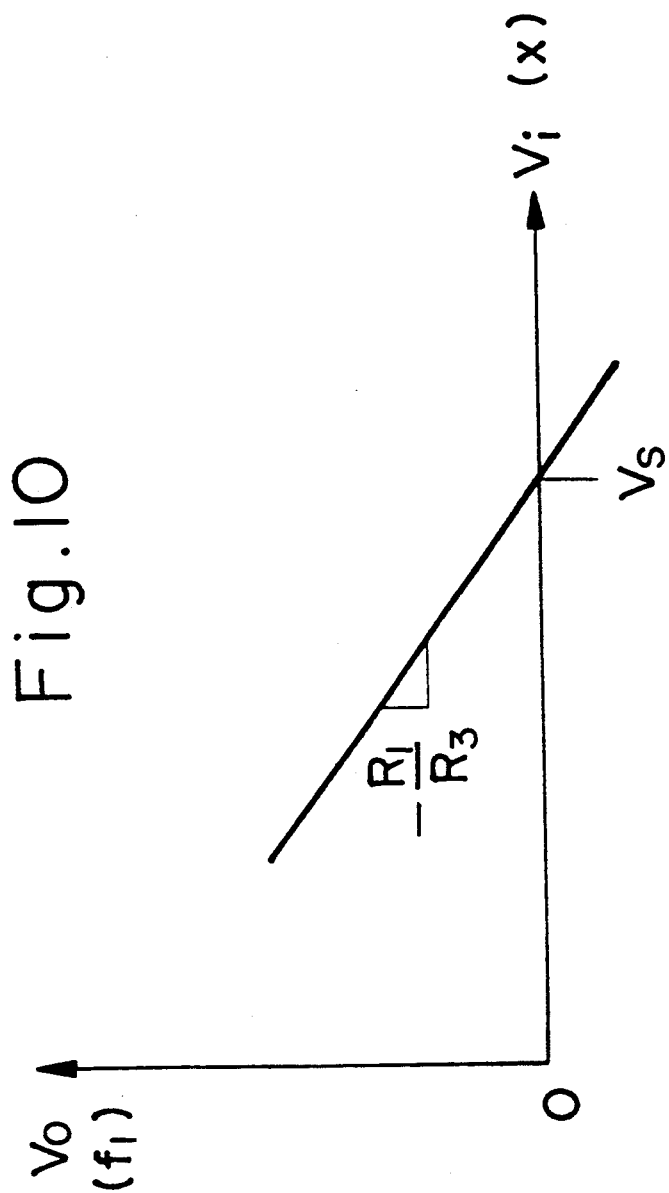
FIG. 10 is a graph showing the input/output characteristic thereof.

Accordingly, as shown in FIG. 10, the slope of function $f_1$ is given by $(-R_1/R_3)$ and can be varied by changing the value of resistor $R_1$. The position of the function (i.e., its intercepts) can be adjusted by the voltage $V_s$.

Figure 11:
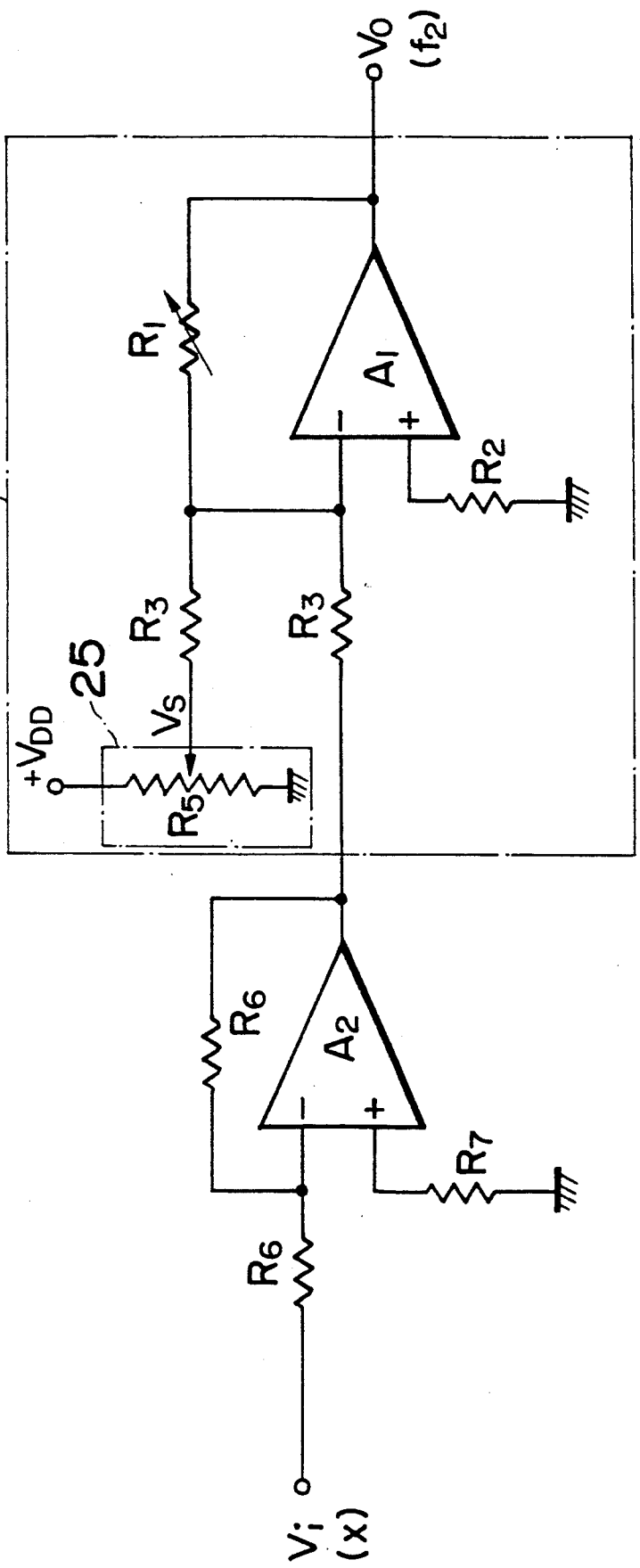
FIG. 11 is a circuit diagram showing another example of a function generator circuit.

An example of the circuit 24 which generates the function $f_2$ is depicted in FIG. 11. The circuit 24 is obtained by connecting an inverter to the input side of the above-described circuit 23. The inverter includes an operational amplifier A2, an input resistor and a feedback resistor $R_6$ which are same value, and the like. The slope and position of the function $f_2$ in circuit 24 can also be varied.

As set forth above, a triangular membership function having any slope and any position can be set by changing the values of resistors $R_1$, $R_5$. The dials of these resistors $R_1$, $R_5$ for setting the function are provided on a panel of the programming unit 14.

Figure 12:
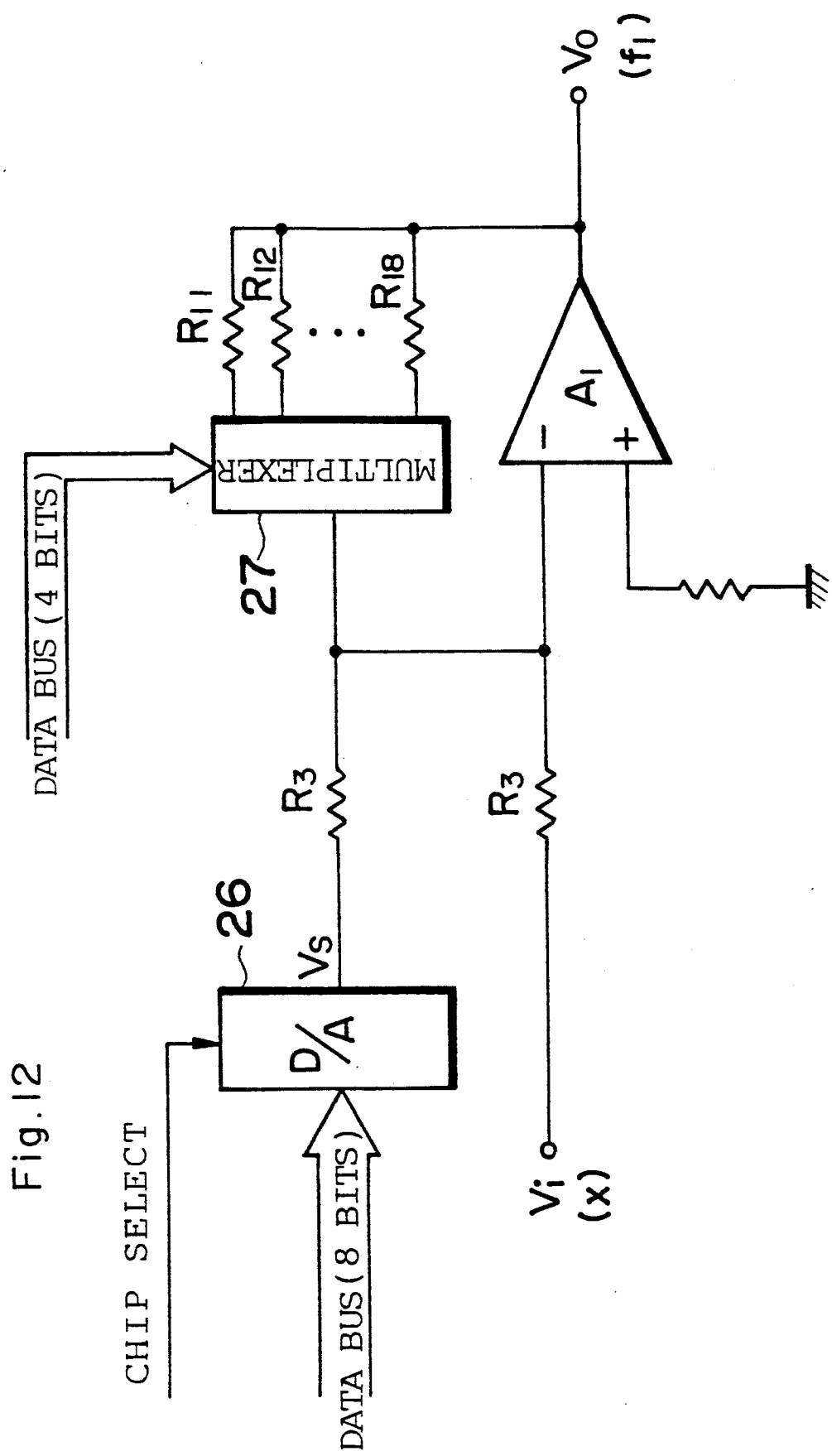
FIG. 12 is a block diagram showing an example of an analog-type membership function circuit capable of being digitally controlled.

It is also possible to arrange it so that the setting and modification of the membership function are carried out under the control of a CPU incorporated in the programming unit 14. An example of a circuit suitable for such control is illustrated in FIG. 12. This is an example of a circuit for generating the function $f_1$. In comparison with the circuit of FIG. 9, the circuit 25 which generates the voltage $V_s$ is realized by a D/A converter circuit 26, and instead of the feedback resistor $R_1$, there are provided a large number (e.g., eight) of parallel-connected feedback resistors $R_{11}$-$R_{18}$ having different resistance values, and an analog multiplexer 27 for selecting any of these resistors. By applying data (e.g., eight bits) representing the desired voltage Vs to the D/A converter circuit 26 though a data bus, the corresponding analog voltage is generated by the D/A converter circuit 26. Further, by supplying the analog multiplexer 27 with data (e.g., four bits) for selecting a prescribed single feedback resistor from among the feedback resistors $R_{11}$-$R_{18}$, the feedback resistor designated by this data is selected so that only this feedback resistor is connected across the input and output terminals of the operational amplifier A1, thereby deciding slope.

The circuit 23 used in the circuit (FIG. 11) for generating the function $f_2$ also has the same construction as shown in FIG. 12. As a result, a membership function having any slope and position can be set under the control of a CPU.

Figure 13:
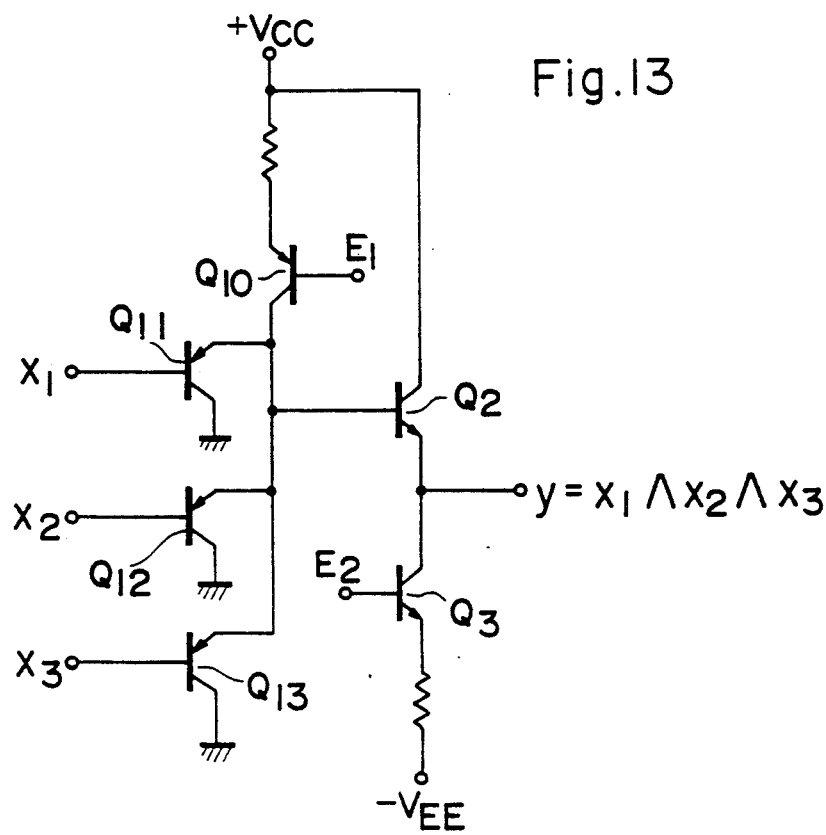
FIGS. 13 an 14 are circuit diagrams respectively showing an example of a MIN circuit and an example of a MAX circuit.
Figure 14:
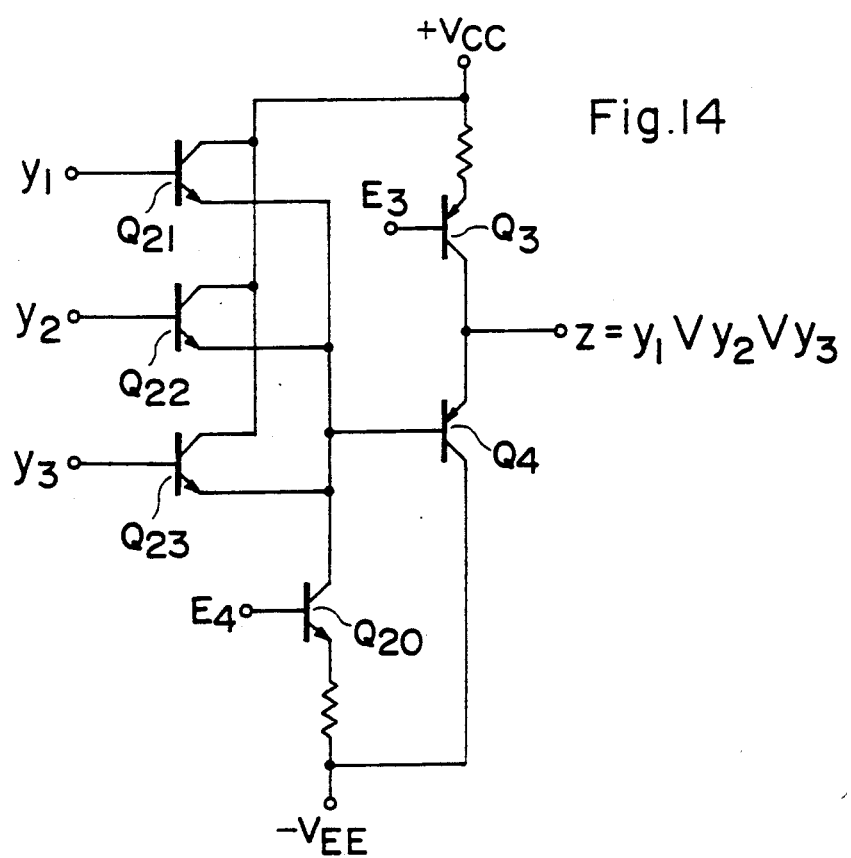

The construction of MIN and MAX circuits is well known and will be touched upon only briefly here. FIG. 13 shows an example of a three-input MIN circuit, which comprises emitter-connected transistors $Q_{11}$, $Q_{12}$, $Q_{13}$ (comparator circuits) having inputs $x_1$, $x_2$, $x_3$ applied to their bases, respectively, a transistor $Q_{10}$ which acts as a current source of these transistors, a transistor $Q_2$ which compensates for base/emitter voltage, and a transistor $Q_3$ serving as the current source of the transistor $Q_2$. FIG. 14 illustrates an example of a three-input MAX circuit, which comprises emitter connected transistors $Q_{21}$, $Q_{22}$, $Q_{23}$ (comparator circuits) having inputs $y_1$, $y_2$, $y_3$ applied to their bases, respectively, a transistor $Q_{20}$ which acts as a current source of these transistors, a transistor $Q_4$ which compensates for base/emitter voltage, and a transistor $Q_5$ serving as the current source of the transistor $Q_4$.

Several examples of digital-type TG's will now be described.

Figure 15:
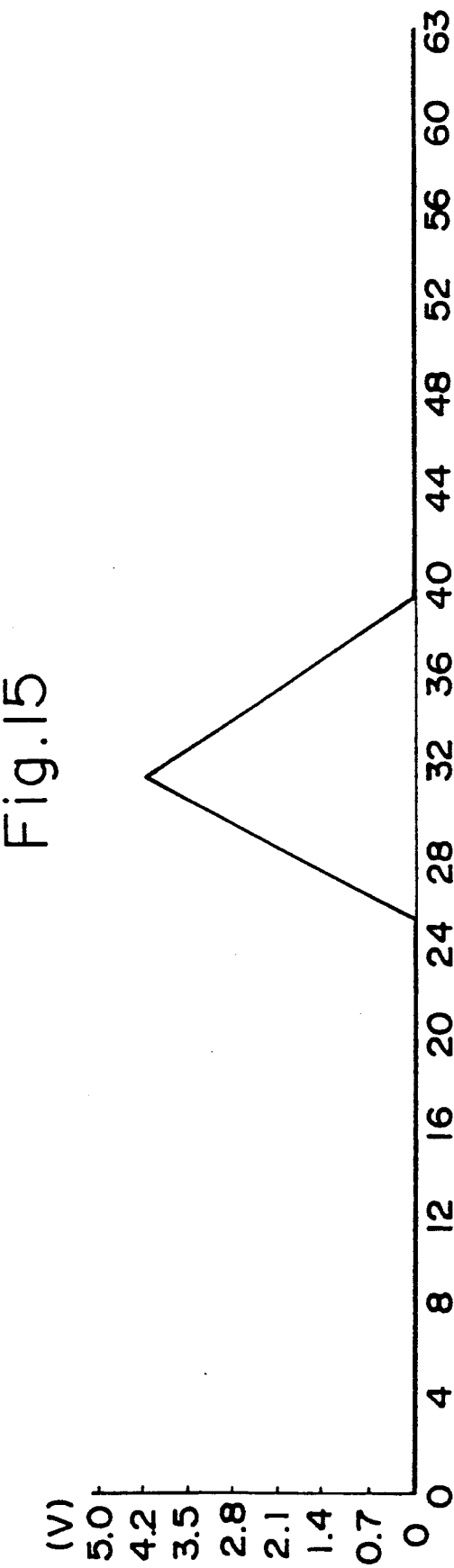
FIGS. 15, 16 and 17 are graphs respectively showing examples of a basic membership function, seven kinds of membership functions and eight types of membership functions set in a memory.

Basically, a digital-type TG stores data related to a membership function in a memory in advance, reads corresponding data out of the memory in conformity with the input x (or y or z; hereinafter the input will be represented by x), and outputs an analog quantity (analog voltage), which corresponds to the read data, as a truth value $T_x$. Accordingly, the membership function stored in the memory is expressed by discrete values. In this embodiment, the variable x is represented by six-bit address data ($a_0$–$a_5$, described later) and can take on 64 different values, as illustrated in FIG. 15. The grades of the membership function are divided into eight levels of from 0 to 5 V and are expressed or designated by three-bit data ($d_0$–$d_2$ or $d_4$–$d_6$, described later).

Figure 16:
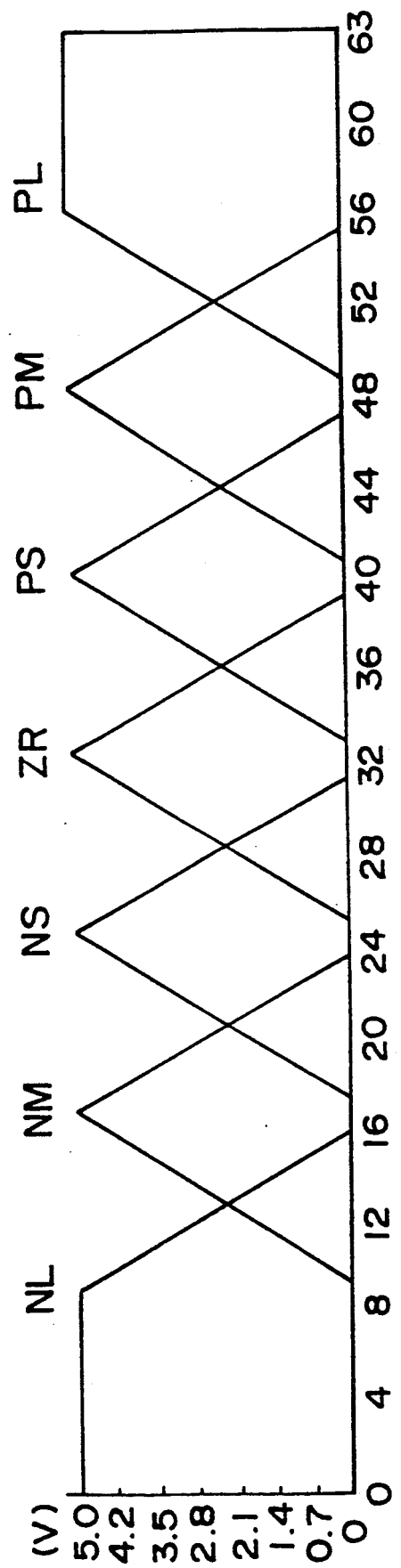

As shown in FIG. 16, the seven kinds of membership functions NL–PL are set on the 64 discrete variables. Though it is possible to designate the kinds of membership function by three-bit address data, in this embodiment the membership function is designated by designating the memory chip and an area within the chip.

For each kind of membership function, it is possible to set eight types of membership functions having different shapes and positions. These types are designated by three-bit address data ($a_6$–$a_8$ or $a_9$–$a_{11}$, described later).

Figure 17:
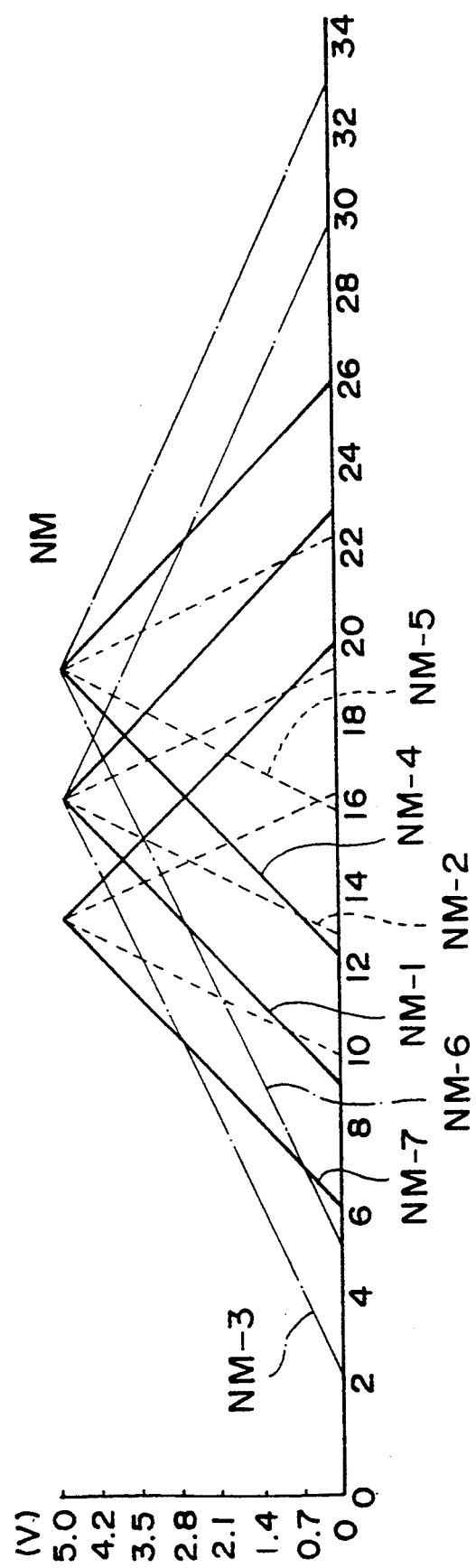

FIG. 17 illustrates an example of eight types of membership functions NM-1, NM-2, . . . , NM-8 set with regard to the membership function NM.

Figure 19:
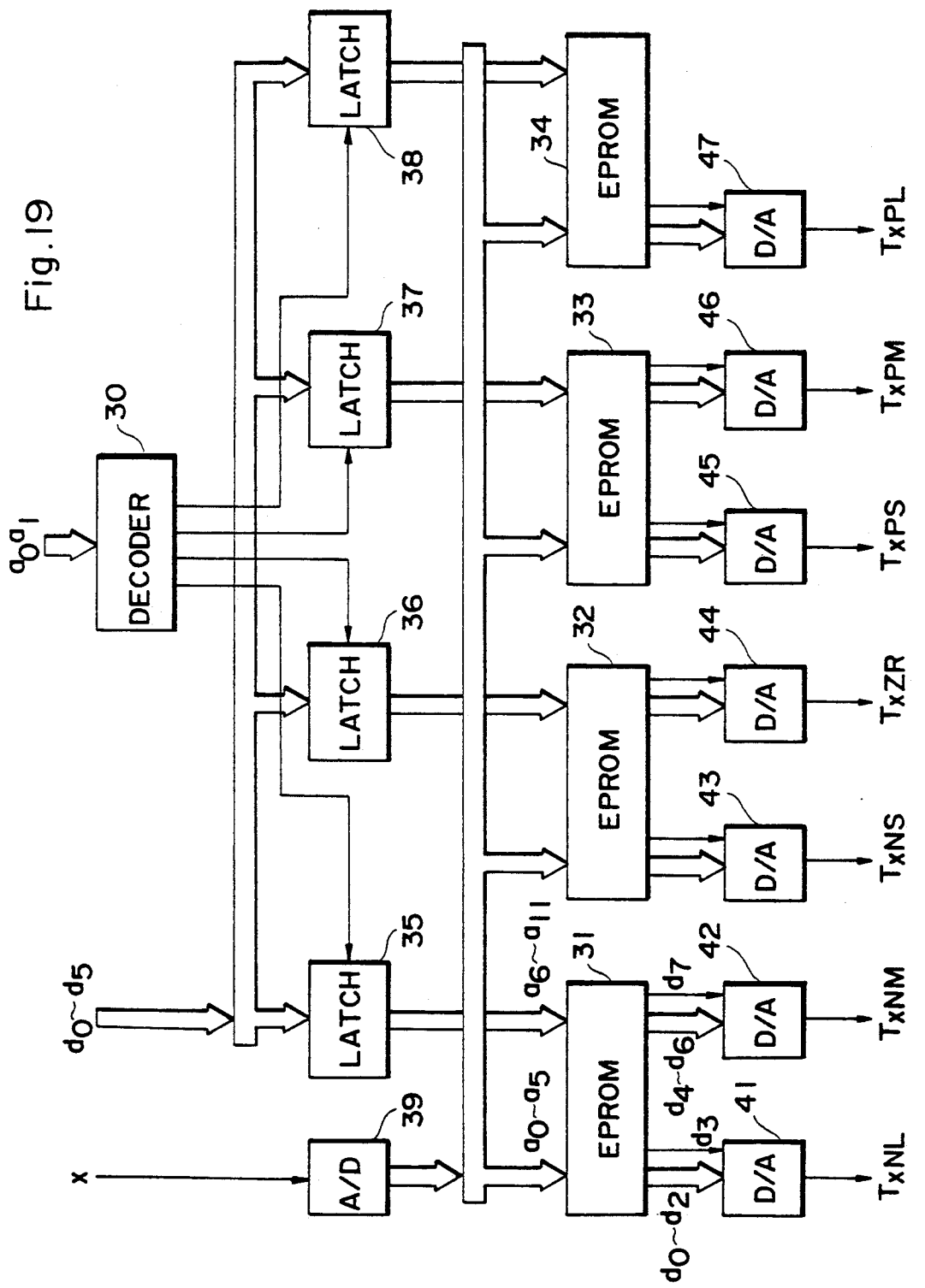
FIG. 19 is a block diagram showing an example of a digital-type truth value generator circuit.

FIG. 19 shows an example of the construction of a TG. EPROM's 31–34 are used as memories for storing membership functions, and data representing two kinds and 16 types of membership functions are written in each EPROM (except that data representing eight types of membership functions of one kind are written in EPROM 34). Data representing 16 types of membership functions NL-1–NL-8, NM-1–NM-8 relating to the membership functions NL and NM are stored in the EPROM 31, the memory map of which is shown in FIG. 18. The address data $a_{11}$–$a_9$ of the three most significant bits are used in designating the eight types NM-1–NM-8 of membership function NM, the address data $a_8$–$a_6$ are used in designating the eight types NL-1–NL-8 of membership function NL, and the address data $a_5$–$a_0$ of the lower order bits designate variable. The grade of a membership function is expressed by data $d_0$–$d_2$ (with regard to membership function NL) or $d_4$–$d_6$ (with regard to membership function NM). The data $d_3$, $d_7$ are used as output enable signals of D/A converters 41–47, described below.

In the same way, data representing eight types of membership functions for each of the membership functions NS and ZR are stored in EPROM 32, data representing eight types of membership functions for each of the membership functions PS and PM are stored in EPROM 33, and data representing eight types of membership functions of the membership function PL are stored in EPROM 34.

Accordingly, designation of the kind and type of membership function can be carried out by designating any of the EPROM's 31–34 and specifying an area within the EPROM. The programming unit 14 designates two kinds of membership functions at a time. In order to select an EPROM, two-bit chip-select data $a_0a_1$ are applied to a decoder 30. At the same time, a prescribed type is designated by data $d_0$–$d_2$ and $d_3$–$d_5$ for each of the two designated kinds of membership function. Among latch circuits 35–38, a latch circuit corresponding to the EPROM selected by the chip-select data $a_0a_1$ latches input data $d_0$–$d_5$ in response to the output of decoder 30. The latched data are applied to the designated EPROM as address data $a_6$–$a_8$, $a_9$–$a_{11}$, whereby the types of two kinds of membership functions stored in the EPROM are designated.

The foregoing operation is performed repeatedly four times by successively designating all of the EPROM's, whereby one type of each of the seven kinds of membership functions is designated.

Meanwhile, the analog input x is converted into digital address data $a_0$–$a_5$ of 64 levels (six bits) by an A/D converter circuit 39, and these address data are applied to all of the EPROM's 31–35. Therefore, in the seven kinds of membership functions already designated, data ($d_0$–$d_2$ and $d_3$–$d_6$) addressed by the address data $a_0$–$a_5$ are read out and applied to the corresponding D/A converter circuits 41–47. At the same time, data $d_3$, $d_7$ are applied to the D/A converter circuits 41–47 as output enable signals. Thus, analog voltage signals of values corresponding to the data delivered by the EPROM's are outputted as the truth values $T_{xNL}$–$T_{xPL}$.

Figure 20:
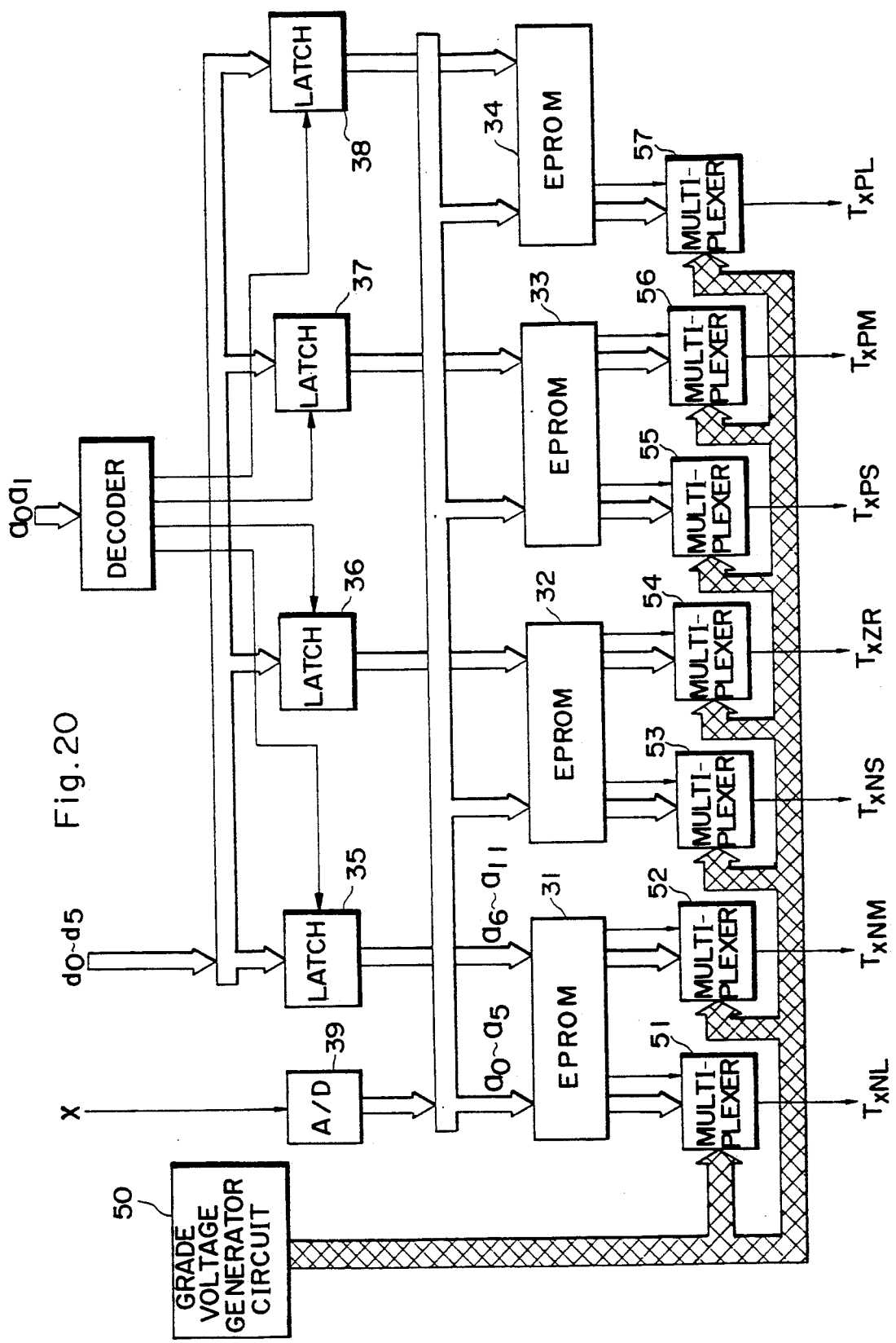
FIG. 20 is a block diagram showing another example of a truth value generator circuit.

FIG. 20 illustrates another example of a TG. Portions identical with those shown in FIG. 19 are designated by like reference characters. Here analog multiplexers 51–57 are provided instead of the D/A converter circuits 41–47. Also provided in a circuit 50 for generating voltages representing grades of membership functions divided into eight levels of 0–5 V. All of these output voltages enter each of the analog multiplexers 51–57. Instead of data representing membership function values, codes for designating the voltages outputted by the grade voltage generating circuit 50 are stored in the EPROM's 31–34 in order to represent the membership functions.

Accordingly, in dependence upon the code read out from the address designated by the input x, any of the inputted grade voltages is selected in each of the analog multiplexers 51–57. The selected voltages are outputted as the truth values $T_{xNL}$–$T_{xPL}$.

Figure 21:
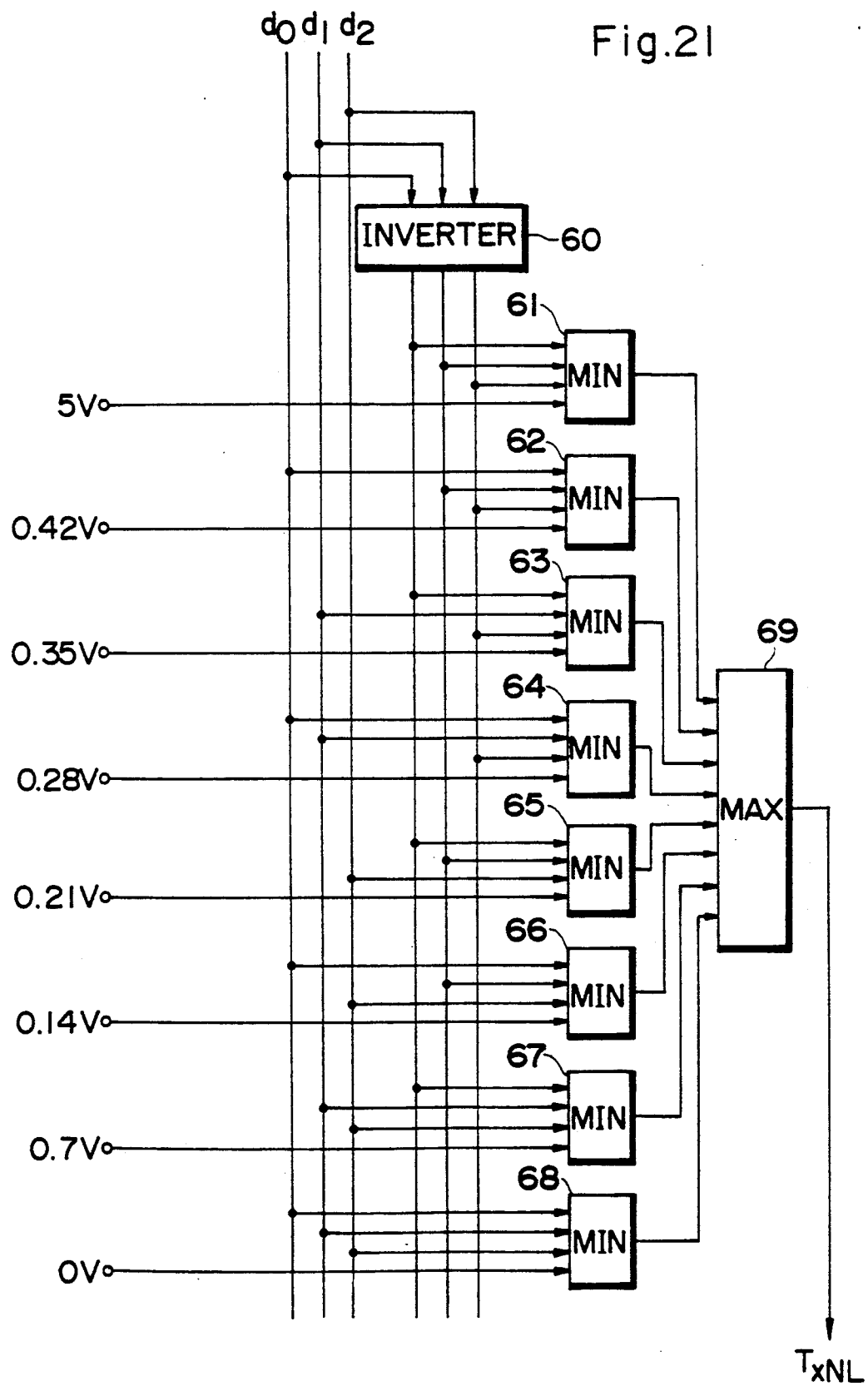
FIG. 21 is a block diagram showing an example in which is a multiplexer is composed of MIN circuits and a MAX circuit.

Though multiplexers which include ordinary analog switches can be used as the analog multiplexers 51–57, the multiplexers can be constructed by combining MIN circuits and a MAX circuit, as shown in FIG. 21. FIG. 21 is illustrated as being substituted for the analog switch 51 which outputs the truth value $T_{xNL}$ of membership function NL. Eight MIN circuits 61–68 and one MAX circuit 69 are provided. An inverter array 60 is provided for inverting each of the items of read data $d_0$–$d_2$ from the EPROM 31. It is assumed that a value of 0 or 1 taken on by the data $d_0$–$d_2$ corresponds to 0 or 5 V, respectively. The MIN circuits 61–68 each receive, as input signals, a respective one of the voltages of eight levels representing grade, as well as three signals selected from among data $d_0$–$d_2$ and the data inverted by the inverter array 60. The MIN circuits 61–68 extract and output the grade voltages designated by the data $d_0$–$d_2$. Any one of the MIN circuits generates a grade voltage, at which time the other MIN circuits output a voltage of 0 V. For example, in a case where the data $d_0d_1d_3$ is 000, a grade voltage of 5 V is outputted by the MIN circuit 61, to which the inverted data 111 is applied, and the outputs of the other MIN circuits 62–68 are 0 V, since these MIN circuits necessarily receive 0 data (i.e., a voltage of 0 V). The maximum voltage from among these MIN circuits 61–68 is selected by the MAX circuit 69 and outputted as the truth value $T_{xNL}$.

(3) Truth-valued-flow inference unit (TVFI)

Figure 22:
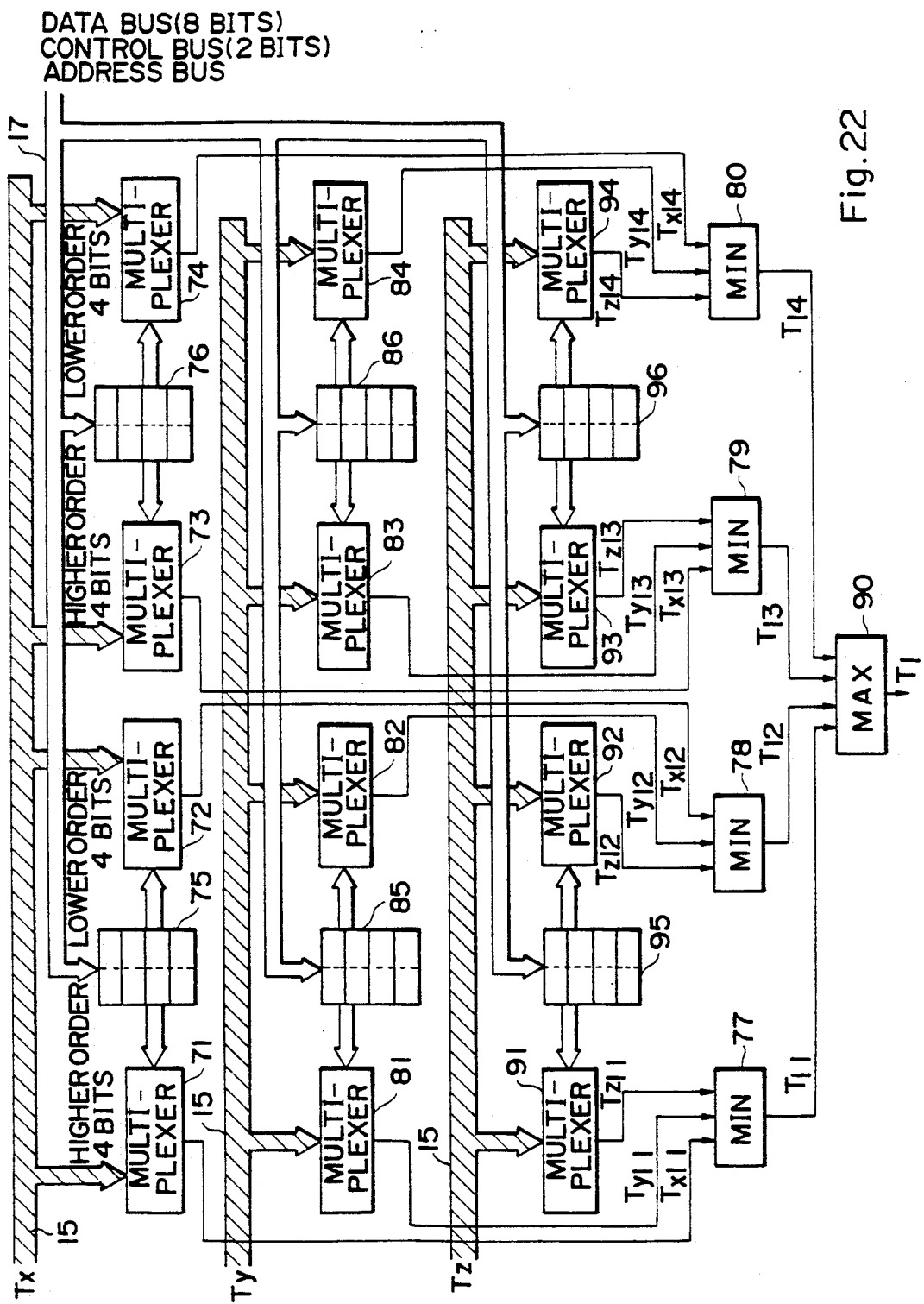
FIG. 22 is a block diagram showing the construction of a truth-valued-flow inference unit.

FIG. 22 shows the construction of one channel of the TVFI's (TVFI1 in FIG. 5). The TVFI1 is constituted by the selector circuit 18 and operation circuit 19, as set forth above.

The selector circuit 18 includes 12 multiplexers 71–74, 81–84, 91–94 and six register files 75, 76, 85, 86, 95, 96. The seven truth values $T_x$ ($T_{XNL}$–$T_{XPL}$) outputted by the TG1 are applied to the multiplexers 71–74 through the truth value bus 15. In the same way, the seven truth values $T_y$ outputted by the TG2 are applied to the multiplexers 81–84 through the bus 15, and the seven truth values $T_z$ outputted by the TG3 are applied to the multiplexers 91–94 through the bus 15.

As mentioned above, one channel includes the four antecedents of an implication. The truth values of one antecedent are selected by the multiplexers 71, 81 and 91. That is, the rule which stipulates one antecedent is decided by the truth values selected by these multiplexers 71, 81, 91. Likewise, the multiplexers 72, 82, 92 form one antecedent, the multiplexers 73, 83, 93 form one more antecedent, and the multiplexers 74, 84, 94 form one more further antecedent.

The multiplexers 71, 72 are controlled by data in the register file 75. The data register 75 incorporates four eight-bit registers, the data in one of which controls the multiplexers 71, 72. More specifically, from among the eight bits of data, the multiplexer 71 is controlled by the four higher order bits, and the multiplexer 72 is controlled by the four lower order bits. From among the four bits of data controlling the respective multiplexers, three bits are used in order to designate one of the seven truth values inputted to the multiplexer, and the remaining bit is used as an output enable signal.

Since the register file 75 is equipped with four eight-bit registers, it is possible to set four different rules. The register file 75 is connected to an eight-bit data bus, a two-bit control bus and an address bus. The data bus is used in order to transfer data to be set in the register, and the two-bit signal on the control bus is used in order selectively designate any one of the four registers in the one register file 75. The address bus is used to transfer address data which designates the register file. These data, control and addresses buses are constructed as part of the system bus 17 shown in FIG. 5.

The register file 75 incorporates four eight-bit registers. Therefore, when the multiplexers 71, 72 are being controlled by the data in one of these registers, data stipulating other rules can be written in the other registers. Also, it is possible to modify the register controlling the multiplexers 71, 72 by the abovementioned two-bit control signal. Thus, it is possible to modify rules rapidly while the TVFI is operating.

Likewise, the register files 76, 85, 86, 95, 96 each are equipped with four eight-bit registers and connected to the eight-bit data bus and two-bit control bus of the system bus. The register file 76 is used to control the multiplexers 73, 74, the register file 85 to control the multiplexers 81, 82, the register file 86 to control the multiplexers 83, 84, the register file 95 to control the multiplexers 91, 92, and the register file 96 to control the multiplexers 93, 94, and from among the seven truth values inputted to the corresponding multiplexers in accordance with the data (rules) set in the registers within these register files, one truth value is selected. Modification of the rules can be performed rapidly in the same manner as described above.

The truth values $T_{x11}$, $T_{y11}$, $T_{z11}$ selected by the multiplexers 71, 81, 91 in accordance with the antecedents (rules) of set implications are applied to a MIN circuit 77, where these truth values are subjected to a MIN operation. Similarly, the truth values $T_{x12}$, $T_{y12}$, $T_{z12}$ outputted by the multiplexers 72, 82, 92 are applied to a MIN circuit 78, the truth values $T_{x13}$, $T_{y13}$, $T_{z13}$ outputted by the multiplexers 73, 83, 93 are applied to a MIN circuit 79, and the truth values $T_{x14}$, $T_{y14}$, $T_{z14}$ outputted by the multiplexers 74, 84, 94 are applied to a MIN circuit 80. The output truth values $T_{11}$, $T_{12}$, $T_{13}$ and $T_{14}$ of these MIN circuits 77, 78, 79 and 80 are applied to a MAX circuit 90, and the operation of Eq. (8) is performed by the MIN circuits 77–80 and MAX circuit 90, thereby providing the final truth value $T_1$.

It goes without saying that the other TVFI's, namely TVFI2 through TVFIn, are identically constructed.

(4) T converter

The T converter performs the operation of Eq. (12). The coefficients $k_1$, $k_2$, $k_3$, $k_4$, $k_5$, $k_6$, $k_7$ representing the singletons (see FIG. 4) which typify the membership functions NL, NM, NS, ZR, PS, PM, PL are stored in register files 101, 102, 103, 104, 105, 106, 107, respectively. These register files 101–107 also each include a plurality of registers and are connected to the programming unit 14 by the system bus 17. A plurality of different values can be written as the coefficient $K_i$ of one register file, and it is possible to modify coefficients while the T converter is operating.

The coefficients $k_1$, $k_2$, $k_3$, $k_4$, $k_5$, $k_6$, $k_7$ of the register files 101–107 are applied to corresponding D/A converter circuits 111, 112, 113, 114, 115, 116, 117, respectively. Voltages respectively representing the truth values $T_1$–$T_7$ outputted by the TVFI1–TVFI7 are applied as reference voltages to these D/A converter circuits 111–117 through the bus 16. As will be illustrated later, the D/A converter circuits 111–117 output respective analog currents $I_{1i} = \alpha T_i \cdot k_i$ (i=1–7) proportional to the inputted voltage $T_i$ and coefficient $k_i$. These currents are added together at nodes N1, with the result being inputted to a current/voltage converter circuit 108. Accordingly, the circuit 108 outputs a voltage proportional to the numerator $\Sigma T_i \cdot k_i$ of Eq. (12).

By applying the voltages representing the truth values Ti (i=1–7) to the resistors, currents $I_{2i}$ (i=1–7) flow through these resistors are generated, the currents are added together at nodes N2 and the result enters a current/voltage converter circuit 118. Accordingly, the circuit 118 outputs a voltage proportional to the denominator $\Sigma T_i$ of Eq. (12).

The output voltages of the circuits 108, 109 are applied to a divider circuit 109, which performs the operation of Eq. (12). A voltage representing the result of this operation is amplified by an amplifier circuit 110, the output of which is the definite value d.

Figure 24:
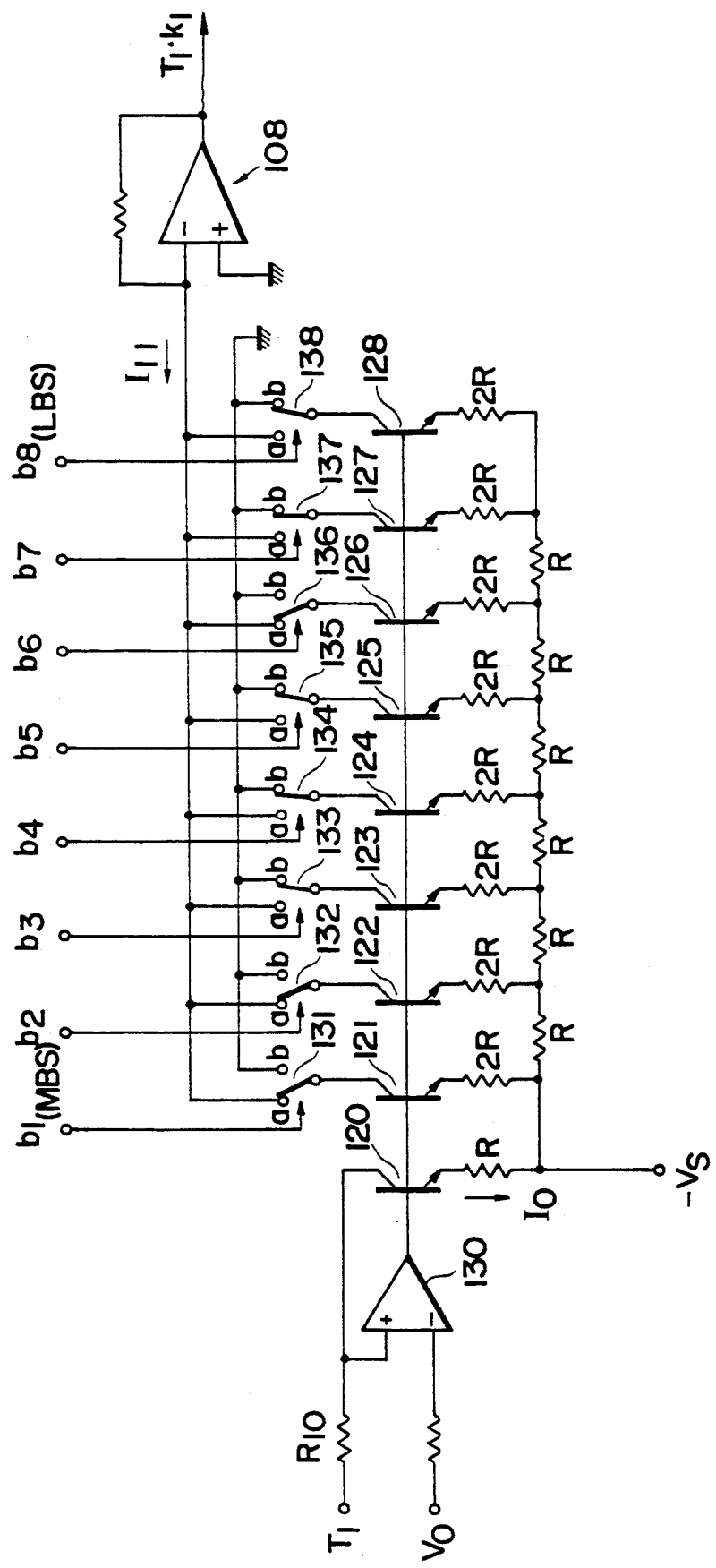
FIG. 24 is a circuit diagram showing an example of a D/A converter circuit.

An example of the D/A converter circuit 111 is shown in FIG. 24. The other D/A converter circuits 112-117 are exactly the same in construction, the only difference being the input reference voltages $T_i$.

The coefficient $k_1$ is given by eight-bit data $b_1$-$b_8$ and is used to control changeover switches 131-138. For example, when a corresponding data bit is 1, the changeover switch is connected to a terminal a; when the bit is 0, the changeover switch is connected to a terminal b. The terminal a of all of the changeover switches 131-138 are connected to one another and to the current/voltage converter circuit 108. The terminals b of all of the changeover switches are connected to one another and to ground.

A current source which includes a transistor 120 is provided, and the transistor 120 is controlled by the output voltage of a differential amplifier circuit 130. The differential amplifier circuit 130 is provided with a reference voltage, which represents the truth value $T_1$, and a constant voltage $V_0$. If $R_{10}$ represents an input resistor to which the voltage representing the truth value $T_1$ is applied, a current proportional to $T_1/R_{10}$ will flow into the transistor 120.

Eight transistors 121-128 whose bases are common with that of transistor 120 are provided and have their emitters connected to resistors 2R, R, which decide the weighting of bits $b_1$-$b_8$. For example, the transistor 121 has a weighting of $\frac{1}{2}$, and a current $(\frac{1}{2})I_0$ which is one-half of the current $I_0$ that flows into the transistor 120 flows into this transistor 121. Similarly, the resistance values are so adjusted that a current of $(1/256)I_0$ will flow into transistor 128, by way of example. The transistors 121-128 are connected to the changeover switches 131-138.

Accordingly, the current $I_{11}$ which flows into the current/voltage converter circuit 108 is proportional to $(T_1/R_{10}) (b_8/256 + b_7/128 + \ldots + b_2/4 + b_1/2)$. Here $b_1$-$b_8$ take on values of 1 or 0. Since $(b_8/256 + \ldots + b_1/2)$ is proportional to the coefficient $k_1$, the current $I_{11}$ is proportional to $T_1 \cdot k_1$.

Figure 23:
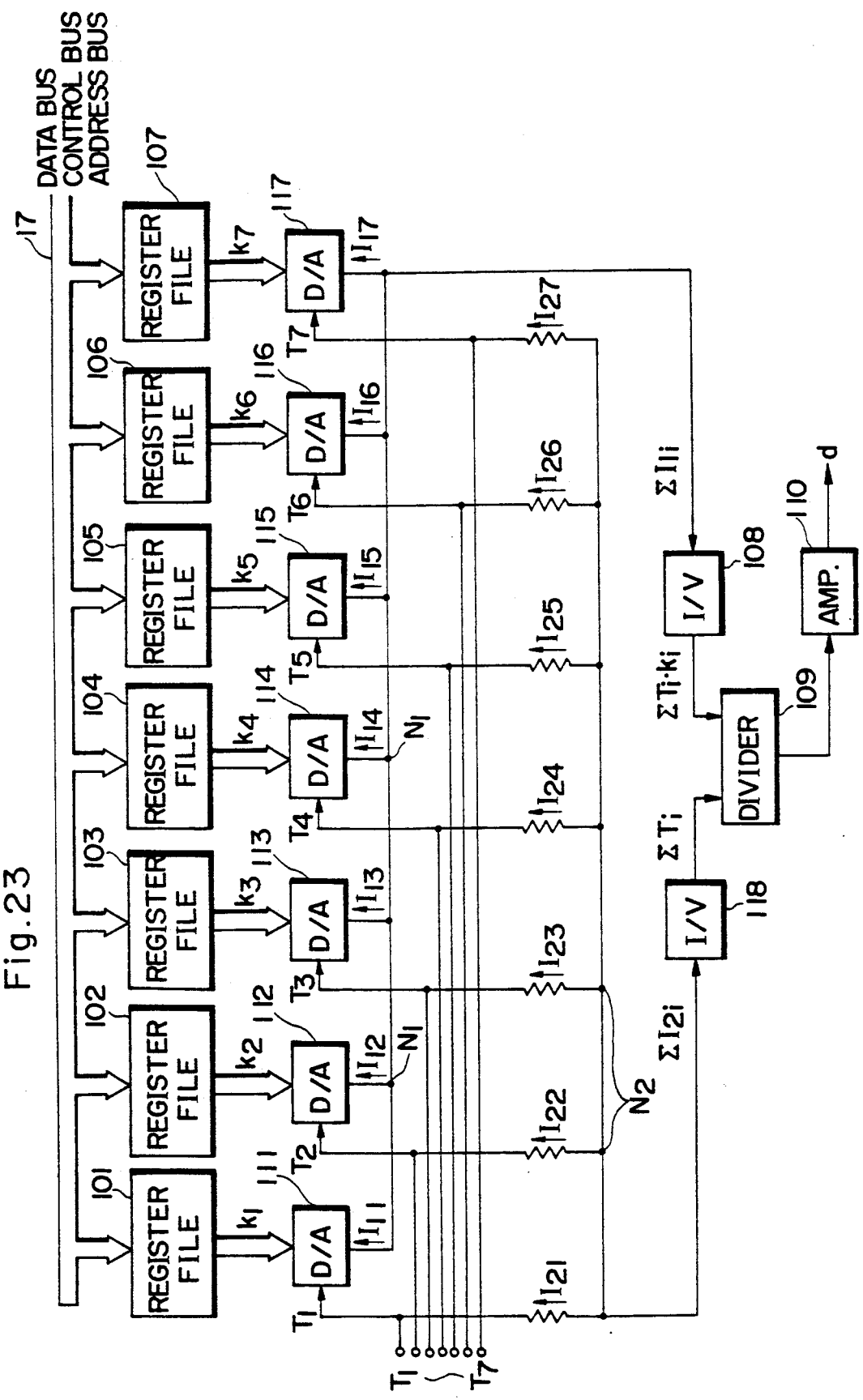
FIG. 23 is a block diagram showing the construction of a T converter.

Since only the D/A converter circuit 111 is illustrated in FIG. 24, only the output current $I_{11}$ of the circuit 111 is shown to be flowing into the current/voltage converter circuit 108. However, it goes without saying that the output currents $I_{12}$-$I_{17}$ of the other D/A converter circuits 112-117 are applied to the circuit 108 as shown in FIG. 23.

(5) Programming unit

The programming unit 14 mainly has the following functions:

1. It is capable of setting rules for fuzzy inference and of displaying the set rules.
2. It is capable of setting the kinds and types of membership functions and of displaying the kinds and types of membership functions set.
3. It is capable of setting the weighting coefficients $k_i$ ($i = 1$-7) and of displaying the weighting coefficients set.
4. It is capable of displaying the truth values $T_i$ ($i = 1$-7) of each TVFIi and the value of the definite output (conclusion) d.

Figure 25:
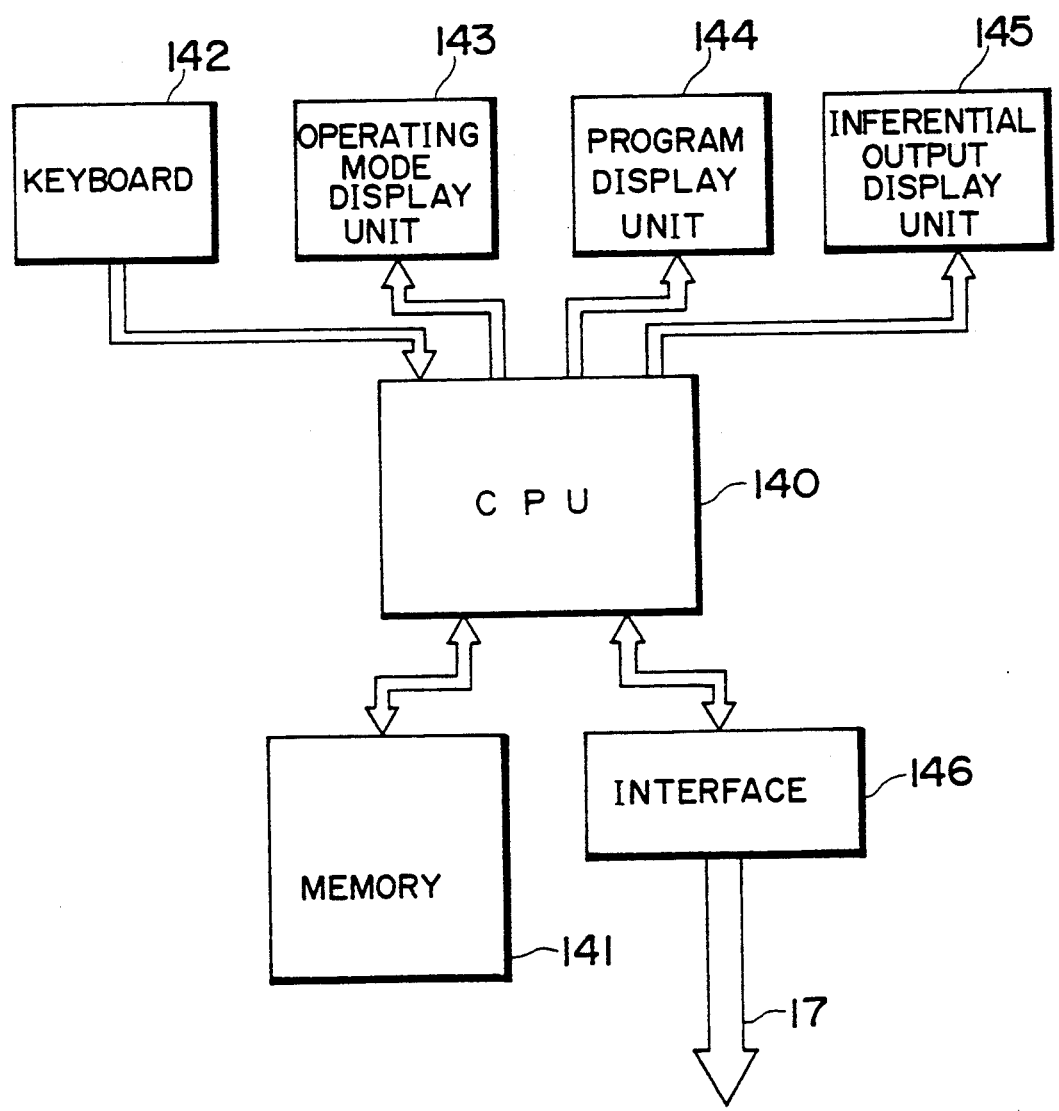
FIG. 25 is a block diagram showing the construction of a programming unit.

The general features of the electrical construction of the programming unit 14 is shown in FIG. 25. The programming unit 14 includes a CPU 140, which is equipped with a memory 141 for storing the execution program of the CPU as well as various data. A keyboard 142, operating mode display unit 143, program display unit 144 and inferential output display unit 145 are connected to the CPU 140 via an interface (not shown). Furthermore, the system bus 17 shown in FIG. 5 and the other drawings is connected to the CPU 140 via an interface 146.

Figure 26:
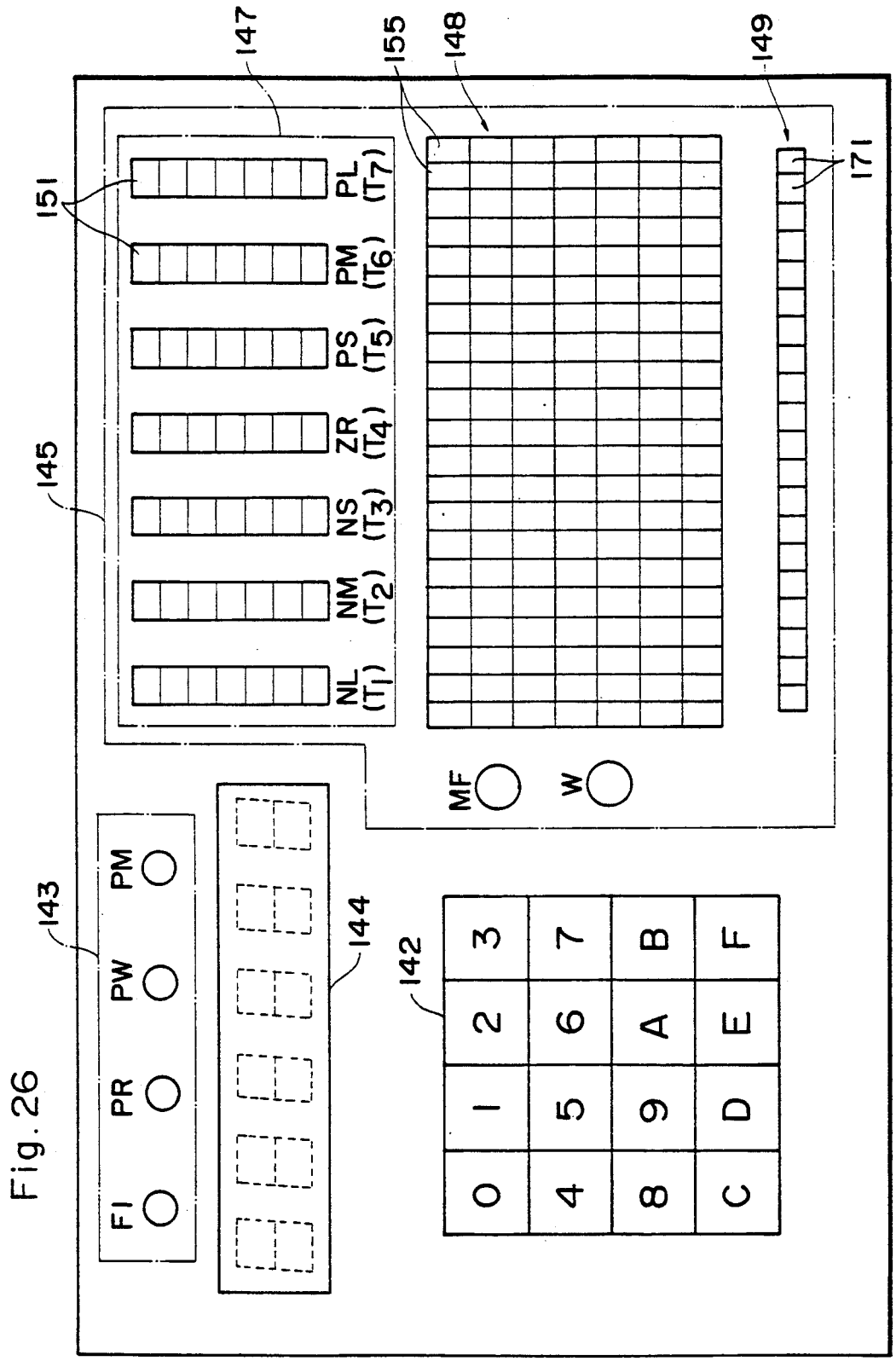
FIG. 26 is a view showing the external appearance of a panel on the programming unit.

FIG. 26 illustrates the external configuration of a panel on which the keyboard 142, operating mode display unit 143, program display unit 144 and inferential output display unit 145 are disposed.

The inferential output display unit 145 comprises a truth value display unit 147, a display unit 148 for displaying membership membership functions and weighted coefficients, a conclusion value display unit 149, a membership function display mode indicator lamp MF, and a weighted coefficient display mode indicator lamp W. The details of these display units 147-149 will be described later.

The operating mode display unit 143 includes four indicator lamps FI, PR, PW and PM, and these indictor lamps light when a fuzzy inference mode, rule setting mode, weighted coefficient setting mode and membership function setting mode, respectively, are set by a key A on the keyboard 142.

The keyboard 142 includes function keys A-F and numeric keys. The functions of these keys are as follows:

The A key sets the fuzzy inference mode, rule setting mode, weighted coefficient setting mode or membership function setting mode. Each time this key is pressed, the aforementioned four types of operating modes change cyclically in accordance with a fixed sequence. The operating mode indicator lamp which lights among the indicator lamps FI, PR, PW and PM is that for the operating mode set by the key A.

The B key, by being pressed when the fuzzy inference mode has been set, causes a set rule to be displayed on the program display unit 144.

The C key, by being pressed when the fuzzy inference mode has been set, causes a set weighted coefficient $k_1$ to be displayed on the display unit 148.

The D key, by being pressed when the fuzzy inference mode has been set, causes a set membership function to be displayed on the display unit 148.

The E key, by being pressed when display of various values using the B key, C key and D key has been performed in the fuzzy inference mode, causes changeover of the display to the next value. When this key is pressed in various set modes other than the fuzzy inference mode, the set value is read into the CPU 140 or memory 141.

The F key is pressed in a case where a membership function set in an EPROM beforehand is displayed on the display unit 148.

The numeric keys 0 through 9 are used in various set modes in order to enter rules, the kinds and shapes of membership functions and weighted coefficients, as will be described later.

The program display unit 144 is a six-digit segment display and displays numeric information representing rules and so on entered using the numeric keys.

Figure 30:
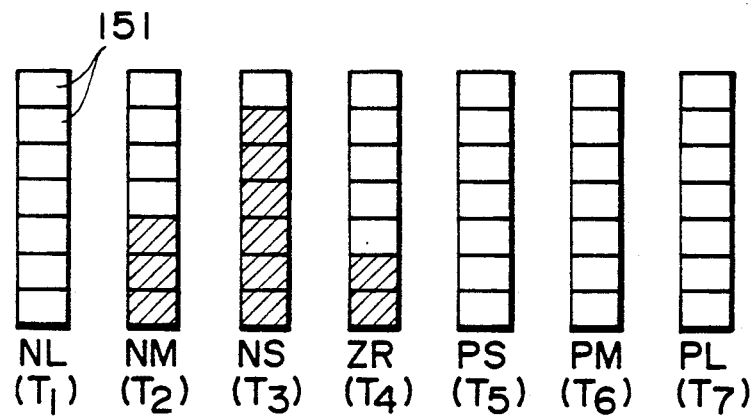
FIGS. 30, 31 and 32 are views respectively showing examples of a truth value display, a weighted coefficient display and a conclusion value display.

The truth value display unit 147 has light-emitting diode (LED) arrays arranged in seven columns and, by way of example, seven LED's 151 are disposed in each of the seven columns. The LED arrays of these columns are used to display truth values $T_1$-$T_7$ outputted by TVFI1 through TVFI7. As shown in FIG. 30, the truth values $T_1$-$T_7$ are expressed by the number (height) of LED's 151 which emit light in respective ones of the corresponding LED arrays. The LED's 151 emitting light in FIG. 30 are indicated by the slanting lines.

Figure 27:
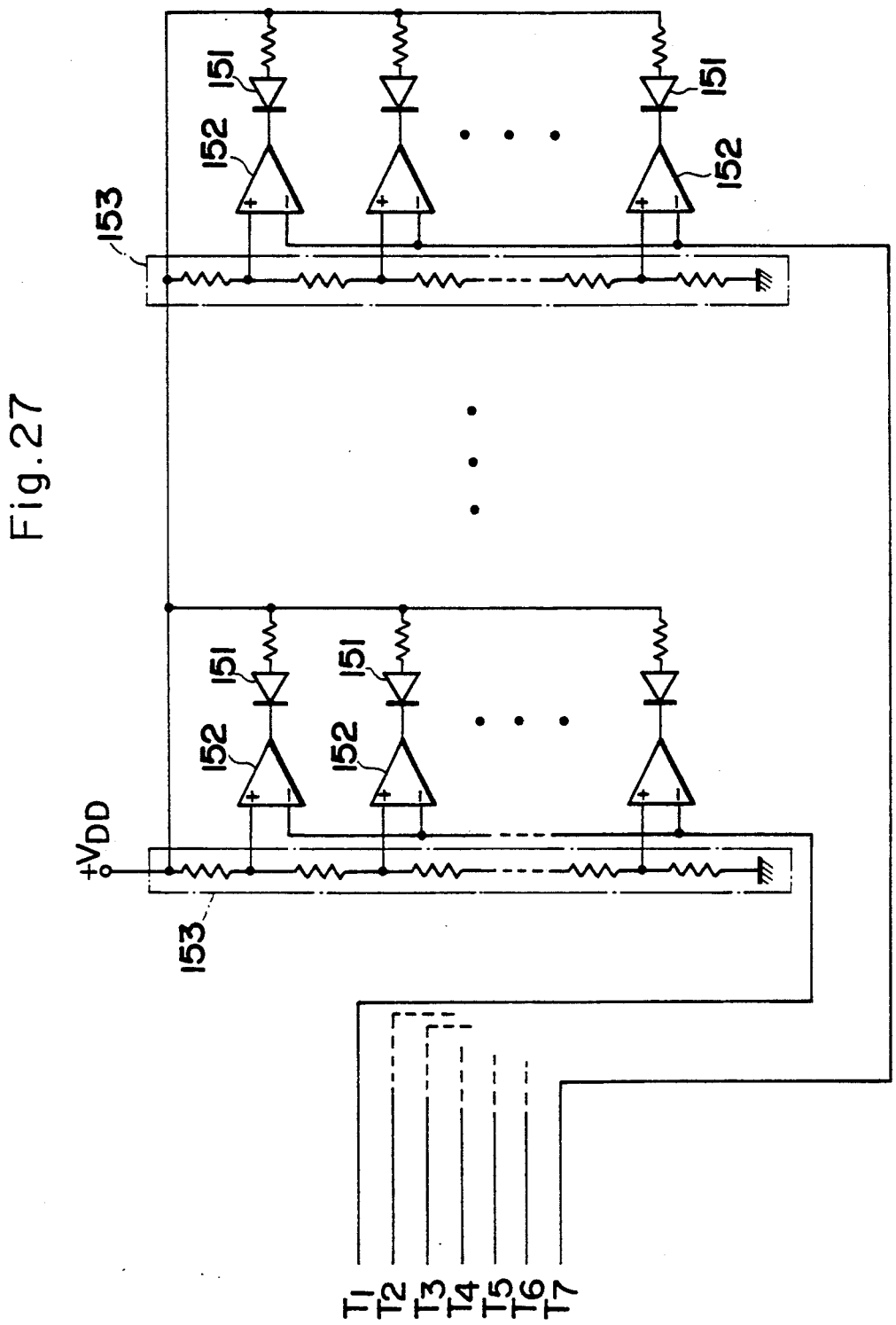
FIG. 27 is a circuit diagram showing an example of a display circuit of a truth value display unit.

An example of the display circuitry of the truth value display unit 147 is depicted in FIG. 27. Since the circuits for displaying the seven columns of LED arrays are exactly the same, a circuit for one column of an LED array display will be described. This circuit includes a reference voltage generator circuit 153 for generating seven different reference voltages. These seven different reference voltages outputted by the circuit 153 are applied to seven comparators 152 at one input terminal thereof. A voltage representing the truth value $T_i$ is applied to the other input terminal of each of the comparators 152. Light emission from an LED 151 is controlled by the output of the corresponding comparator 152. Accordingly, light is emitted only from an LED 151 which corresponds to a comparator 152 provided with a reference voltage lower than the voltage representing the truth value $T_i$.

Figure 28:
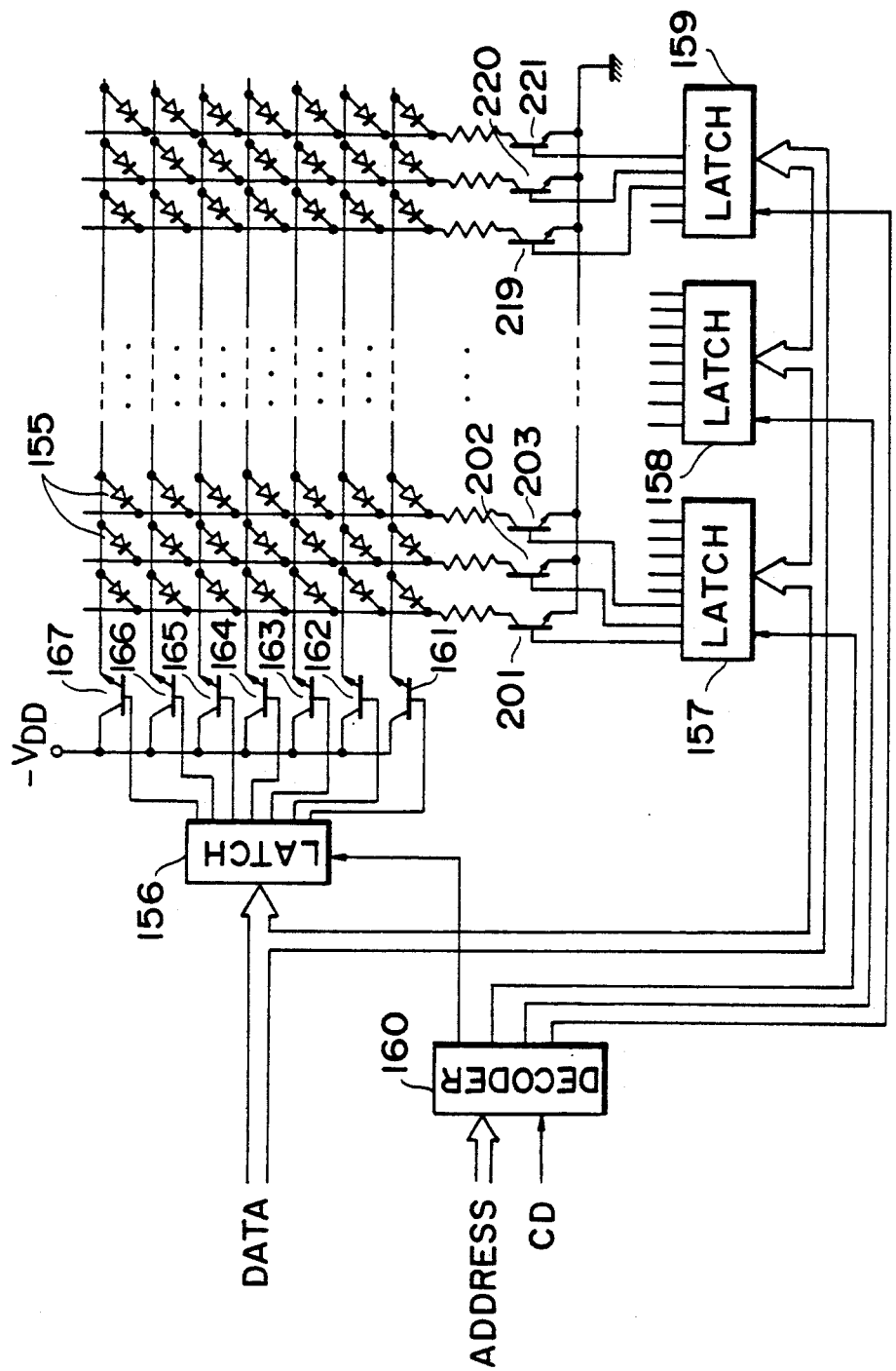
FIG. 28 is a circuit diagram showing an example of a display circuit of a display unit which displays membership functions and weighted coefficients.

The display unit 148 for displaying membership functions and weighted coefficients is composed of an LED array having seven rows and 21 columns of LED's 155, for a total of 147 LED's. An example of the display circuitry of this display unit 148 is illustrated in FIG. 28 As shown in FIG. 28, the 147 LED's 155 construct a matrix array, in which the rows are controlled by seven transistors 161–167 and the columns are controlled by 21 transistors 201–221. Accordingly, any single LED 155 can be made to emit light by turning on one of the transistors 161–167 and one cf the transistors 201–221. In actuality, the transistors 161–167 are scanned to light a number of the LED's 155 simultaneously.

Figure 31:
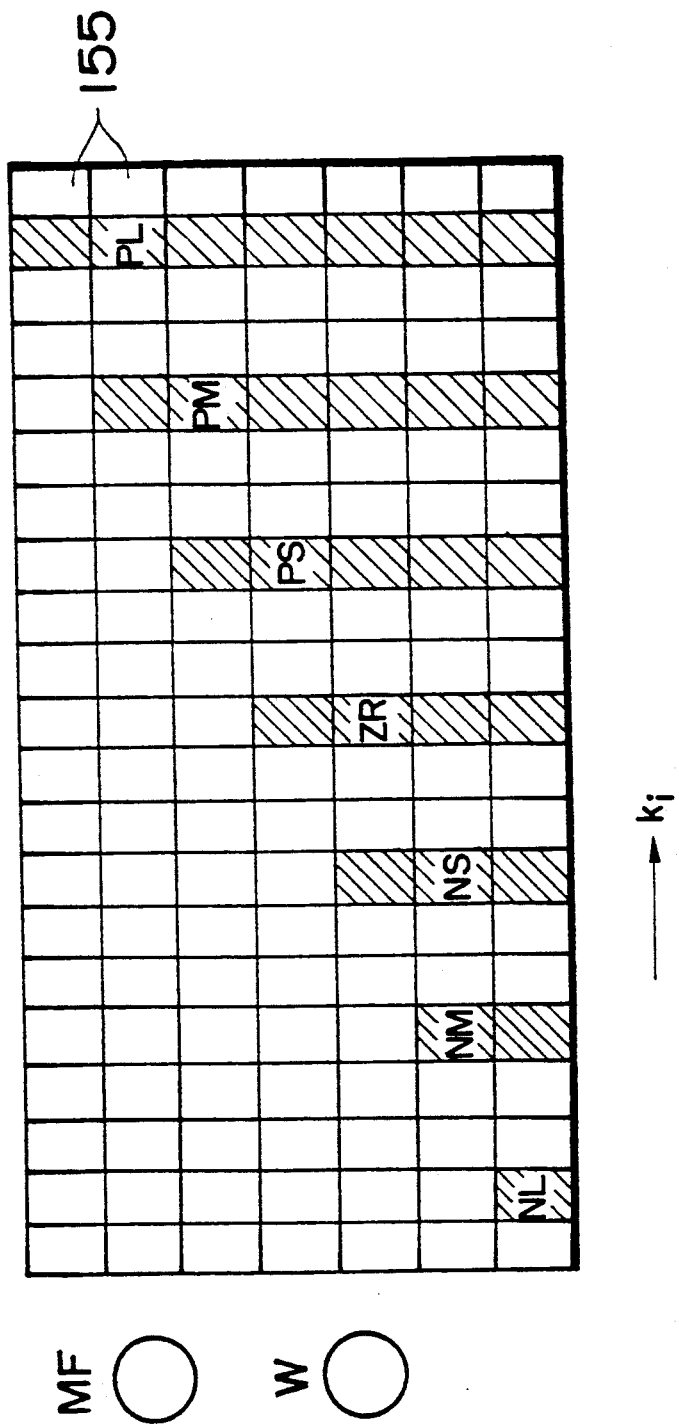

More specifically, in a first scanning interval, transistor 161 is turned on so that the 21 LED's in the lowermost row are placed in a lightable state. Then, those of the transistors 201–221 corresponding to LED's that are to be lit are turned on. In a second scanning interval, the transistor 162 is turned on and prescribed ones of the 21 LED's in the second-from-the-bottom row are lit by the transistors 201–221. Thereafter, and in similar fashion, the transistors 163–167 are turned on and the foregoing operation is repeated every scanning interval. Since the scanning of the transistors 161–167 is carried out cyclically and at high speed, a plurality of the LED's appear to light simultaneously, as shown in FIG. 31 (in which weighted coefficients are being displayed, as will be described later).

Data for controlling the transistors 161–167 and 201–221 are applied to latch circuits 156, 157, 158, 159 a predetermined number of bits at a time in accordance with a fixed sequence by the CPU 140 via a data bus. Data which decide the latch timings of these latch circuits 156–159 are applied to a decoder 160 from the CPU 140 through an address bus, and latch pulses decoded by the decoder 160 enter the latch circuits 156–159. Also applied to the decoder 160 is a display command CD.

Figure 29:
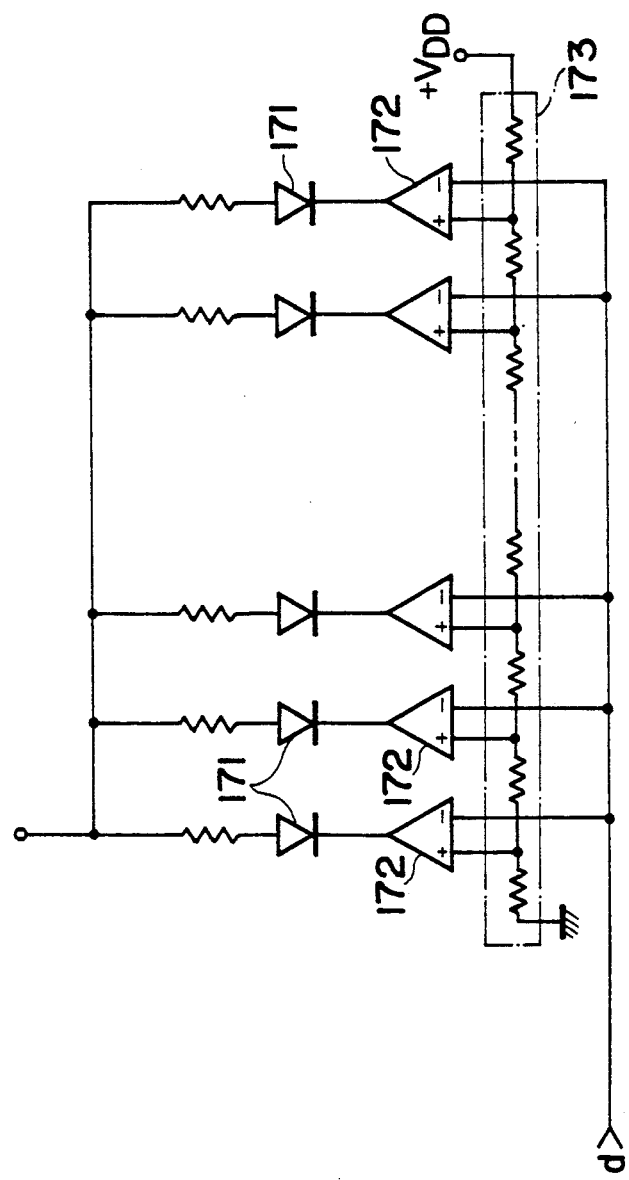
FIG. 29 is a circuit diagram showing an example of a display circuit of a conclusion value display unit.
Figure 32:

The conclusion value display unit 149 is constituted by a plurality, e.g., 20, of LED's 171 arranged in a single horizontal row. An example of a display circuit of the display unit 149 is illustrated in FIG. 29. This display circuit includes a circuit 173 for generating 20 different reference voltages. These different reference voltages are applied to 20 comparators 172 at one input terminal thereof. A voltage representing the determined conclusion d outputted by the T converter 13 is applied to the other input terminal of the comparators 172. Each LED 171 is driven by a corresponding one of the comparators 172. Accordingly, the only LED's 171 that light are those corresponding to comparators 172 provided with reference voltages lower than the voltage representing the conclusion d. As shown in FIG. 32, the conclusion d is expressed by the number of LED's 171 lit (length from the left end).

Finally, examples of the operations for setting rules and weighted coefficients will be described.

Figure 33:
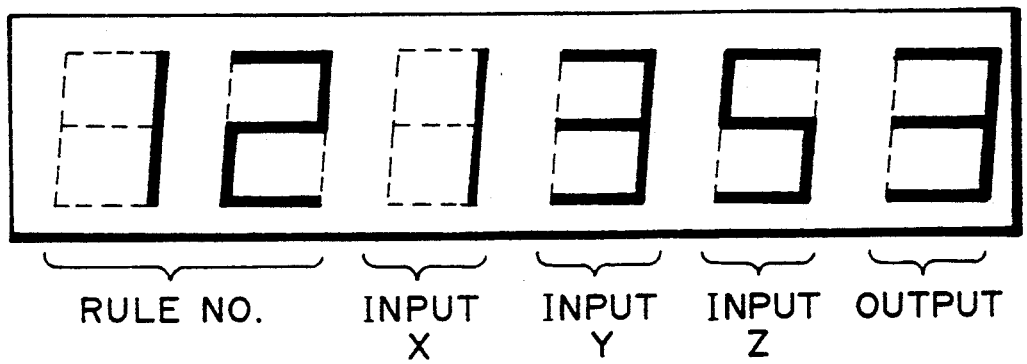
FIGS. 33 and 34 are views each showing an example of a display presented by a program display unit.

Rules are set or modified in the following manner:

Providing that the fuzzy inference mode has been set, the rule setting mode is established by pressing the A key once. If there is a rule that has already been set, at this time the initial rule (Rule No. 1) is displayed on the program display unit 144. The rule numbers are predetermined for each of the registers in the register files 75, 76, 85, 86, 95, 96 included in the selector circuit 18 of the TVFI's. The displayed information on the display unit 144 includes the rule number, input X, input Y, input Z and output, in the order mentioned, as shown in FIG. 33. The seven kinds of membership functions (linguistic information) NL, NM, NS, ZR, PS, PM, PL are designated by the numerals 1, 2, 3, 4, 5, 6, 7, respectively. If the E key is pressed 11 times, Rule No. 12 is displayed. In the example of the display shown in FIG. 33, $$If X=NL, Y=NS, Z=PS \text{ then } U=NS$$

is expressed by Rule No. 12.

If input Y is modified to PM under these conditions, all of the inputs X, Y, Z are re-inputted in the manner 1, 6, 5 using the numeric keys. When entry of a rule ends, the E key is pressed to display the next rule.

Setting or modification of a weighted coefficient will be described next.

An example of a weighted coefficient display on the membership function and weighted coefficient display unit 148 is shown in FIG. 31, as mentioned above. The heights of the lit LED's 155 express the kinds of linguistic information (singleton labels) NL-PL. More specifically, the linguistic information is NL, NM, NS, ZR, PS, PM, PL in the order mentioned from low to high. The positions of these bar-graph-like display columns represented by the lit LED's 155 express respective weighted coefficients. Though the weighted coefficients have values of 1–256, these values are quantized to 21 levels to be displayed.

Figure 34:
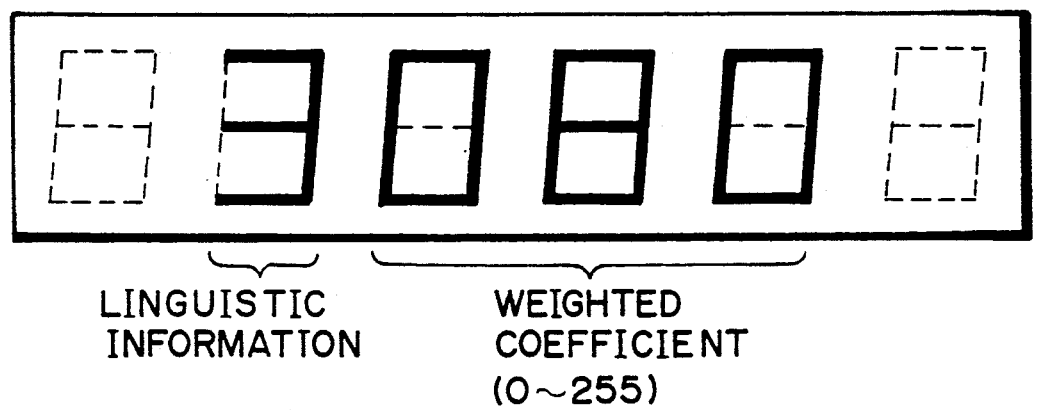

If the A key is pressed twice starting in the fuzzy inference mode, a transition is made to the weighted coefficient setting mode, in which the display on the program display unit 144 becomes as shown in FIG. 34, the already set weighted coefficients are displayed as shown in FIG. 31 and the weighted coefficient indicator lamp W lights. In the program display unit 144 shown in FIG. 34, the numeral which is second from the left indicates the numeral assigned to the linguistic information, and the numerals of the three digits to the right of the abovementioned numeral represent the weighted coefficient. That is, FIG. 34 shows that the weighted coefficient $k_3$ of NS is 80. In order to modify $k_3=80$ to $k_3=100$, it will suffice to press the E key twice and then enter 100 by the numeric keys.

It is possible to establish the membership function setting mode and enter the shape of a desired membership function while expressing the function on the display unit 148 using the program display unit 144. In such case, a RAM is used as a memory for storing the data representing the membership function, and the RAM is set to the write mode.

(6) Main features and examples of applications of a fuzzy inference processing system As shown in FIG. 5, the TG's, TVFI's, T converter, etc., are connected by analog buses 15, 16 comprising seven lines. Accordingly, as indicated by the phantom lines in FIG. 5, it is possible to readily connect other T converters 13A. Further, as illustrated in FIG. 35, a larger scale processing system can be constructed by connecting the TVFI's in hierarchical form. In FIG. 35, inputs are expressed by $x_1-x_m$ and outputs by $d_1-d_1$, and an analog bus is expressed by one line. The system bus is deleted from the drawing.

It is possible for the above-described fuzzy processing system to program membership functions, rules and weighted coefficients on line.

In addition, when membership functions, rules and the T converter possess linearity, this system can be used as a PID controller (PI controller or PD controller).

If the T converter is non-linear, the fuzzy processing system can be used as a non-linear controller.

If 2-valued functions or multivalued functions are set in the TG's and these TG's are operated in a 2-valued mode or multivalued mode, the TVFI's and T converter will also perform 2-valued or multivalued operations and the system will be a 2-valued or multivalued programmable controller.

Accordingly, this system can be an on-line multiple-function controller (a fuzzy controller, PID controller, non-linear controller, 2-valued controller, multivalued controller, etc.) and the operating mode thereof can be appropriately selected.

For example, let us consider a temperature regulating system. This system has a control chamber with an entrance and exit for carrying a material in and out, with the temperature inside the control chamber being controlled by a heater and a cooler.

In an initial stage, the system operates in a PD control mode to rapidly elevate the temperature in the control chamber.

In a second stage, when the temperature in the control chamber has approached a target value, a change is made to a PI control mode in order to prevent or reduce the occurrence of overshoot and perform highly precise control.

If overshoot occurs (this is a third stage), cooling is performed in a non-linear control mode.

In a final stage, the temperature in the control chamber reaches the target value. In this stage, a material is carried into the control chamber and a material is carried out of the control chamber, as a result of which the temperature tends to vary in an irregular manner. Accordingly, operation is performed in the fuzzy control mode.

Furthermore, by modifying the TG's, it is possible for the above-described system to be applied to a case in which inputs are given not as definite values but as membership functions.

What is claimed is:

1. A truth-valued-flow processing unit comprising:
   first bus means having a number of first buses that correspond to a number of types of input variables, each first bus comprising a number of lines equal to a number of predetermined function types used by antecedents of implications;
   a second bus comprising a number of lines corresponding to a number of predetermined function types used by consequents of said implications;
   truth value generator circuits that correspond in number to said number of types of input variables, each truth value generator circuit being connected at an output side to a corresponding one of said first buses, for generating truth values, which represent values of said predetermined functions used in said antecedent of said implication where each said value of said respective predetermined function corresponds to an applied one of said input variables, and outputting the truth values on said corresponding first bus;
   truth-valued-flow inference units that correspond in number to a number of said predetermined functions used by the consequents of the implications, each truth-valued-flow inference unit being connected at an input side to said first buses and at an output side to one of said number of lines of said second bus, for selecting, from all truth values outputted by said plurality of truth value generator circuits and inputted thereto via said first buses, prescribed ones of the truth values in accordance with predetermined rules and for subjecting these truth values to a prescribed operation, thereby each truth-valued-flow inference unit generating a truth value that is to act upon a corresponding consequent and outputting the truth value on said second bus; and
   a truth value converter for causing the truth values outputted by said plurality of truth-valued-flow inference units and inputted thereto via said second bus to respectively act upon the plurality of said predetermined functions used by the consequent, thereby providing an output representing inferential results.

2. The processing unit of claim 1, further comprising singleton means for presenting each of said plurality of predetermined functions used by the consequents in said truth value converter as singletons corresponding to weighted coefficients.

* * * * *